(12) United States Patent
Shimizu et al.

(10) Patent No.: US 12,242,173 B2
(45) Date of Patent: Mar. 4, 2025

(54) LENS BARREL AND IMAGING APPARATUS

(71) Applicant: NIKON CORPORATION, Tokyo (JP)

(72) Inventors: Kunihiko Shimizu, Tokorozawa (JP); Hisanori Togawa, Yokohama (JP); Koji Nagaoka, Yokohama (JP); Takuji Hamasaki, Tokyo (JP)

(73) Assignee: NIKON CORPORATION, Tokyo (JP)

( * ) Notice: Subject to any disclaimer, the term of this patent is extended or adjusted under 35 U.S.C. 154(b) by 895 days.

(21) Appl. No.: 17/269,107

(22) PCT Filed: Aug. 20, 2019

(86) PCT No.: PCT/JP2019/032365
§ 371 (c)(1),
(2) Date: Feb. 17, 2021

(87) PCT Pub. No.: WO2020/040112
PCT Pub. Date: Feb. 27, 2020

(65) Prior Publication Data
US 2021/0311376 A1    Oct. 7, 2021

(30) Foreign Application Priority Data

Aug. 20, 2018    (JP) .................................. 2018-154296

(51) Int. Cl.
| | |
|---|---|
| *G03B 17/14* | (2021.01) |
| *G02B 7/02* | (2021.01) |
| *G02B 7/04* | (2021.01) |
| *G02B 7/14* | (2021.01) |
| *G03B 5/02* | (2021.01) |
| *G03B 17/56* | (2021.01) |

(52) U.S. Cl.
CPC .............. *G03B 17/14* (2013.01); *G02B 7/021* (2013.01); *G02B 7/04* (2013.01); *G02B 7/14* (2013.01); *G03B 5/02* (2013.01); *G03B 17/565* (2013.01)

(58) Field of Classification Search
None
See application file for complete search history.

(56) References Cited

U.S. PATENT DOCUMENTS 9,063,388 B1 *    6/2015   Weber ...................... G03B 9/02
10,365,542 B2 *   7/2019   Shinano ............... G03B 17/565
(Continued)

FOREIGN PATENT DOCUMENTS

| CN | 103676064 A | 3/2014 |
|---|---|---|
| JP | 2009-175484 A | 8/2009 |

(Continued)

OTHER PUBLICATIONS

Nov. 11, 2022 Office Action in Chinese Patent Application No. 201980053347.3.

(Continued)

*Primary Examiner* — Clayton E. LaBalle
*Assistant Examiner* — Diana Hancock
(74) *Attorney, Agent, or Firm* — Oliff PLC

(57) ABSTRACT

A lens barrel includes a first frame, a second frame rotatable with respect to the first frame, an urging member held by one of the first frame and the second frame, and a moving member that is disposed to be movable in optical axis direction and transfers an urging force of the urging member to the another one of the first frame and the second frame.

28 Claims, 13 Drawing Sheets

(56) References Cited

U.S. PATENT DOCUMENTS

| | | | |
|---|---|---|---|
| 11,391,907 B2* | 7/2022 | Nakashima | G02B 27/04 |
| 2011/0013902 A1* | 1/2011 | Kim | G02B 7/026 |
| | | | 396/530 |
| 2015/0103420 A1 | 4/2015 | Santo et al. | |
| 2020/0049929 A1* | 2/2020 | Sato | G02B 7/026 |

FOREIGN PATENT DOCUMENTS

| | | | |
|---|---|---|---|
| JP | 2010145499 A | * | 7/2010 |
| JP | 2013-037090 A | | 2/2013 |
| JP | 2015-099349 A | | 5/2015 |
| JP | 2017-111315 A | | 6/2017 |
| JP | 2018-072403 A | | 5/2018 |

OTHER PUBLICATIONS

Jul. 5, 2022 Office Action issued in Japanese Patent Application No. 2020-538391.

Nov. 12, 2019 Search Report issued in International Patent Application No. PCT/JP2019/032365.

Nov. 12, 2019 Written Opinion of the International Searching Authority issued in International Patent Application No. PCT/JP2019/032365.

Jul. 25, 2023 Office Action issued in Japanese Patent Application No. 2022-150027.

Mar. 15, 2022 Office Action issued in Chinese Patent Application No. 201980053347.3.

Mar. 7, 2023 Office Action issued in Chinese Patent Application No. 201980053347.3.

Apr. 25, 2023 Office Action issued in Japanese Patent Application No. 2022-150027.

Jan. 11, 2022 Office Action issued in Japanese Patent Application No. 2020-538391.

Feb. 27, 2024 Office Action issued in Japanese Patent Application No. 2022-150027.

* cited by examiner (a)

(b)

LENS BARREL AND IMAGING APPARATUS

TECHNICAL FIELD

The present invention relates to a lens barrel and an imaging apparatus.

Priority is claimed on Japanese Patent Application No. 2018-154296, filed Aug. 20, 2018, the content of which is incorporated herein by reference.

BACKGROUND ART

In the related art, a lens barrel that switches between a photographing state and a retracted state is known. By making a switch (a zoom lock mechanism) slide, switching from the retracted state to the photographing state is allowed (for example, Patent Literature 1).

CITATION LIST

Patent Literature

Patent Literature 1

Japanese Patent Application, Publication No. 2017-111315

SUMMARY OF INVENTION

According to a first aspect of the present invention, there is provided a lens barrel which includes a first frame, a second frame which is rotatable with respect to the first frame, an urging member held by one of the first frame and the second frame, and a moving member which is disposed to be movable in an optical axis direction and transfers an urging force of the urging member to another one of the first frame and the second frame.

According to a second aspect of the present invention, there is provided a lens barrel which includes a fixed frame, a rotation frame disposed to be rotatable around an optical axis, an urging member held by one of the fixed frame and the rotation frame, and a moving member disposed to be movable in an optical axis direction, in which another one of the fixed frame and the rotation frame has a first surface and a second surface, and the urging member changes in amount of deflection or total length between a state in which the moving member is in contact with the first surface and a state in which the moving member is in contact with the second surface.

According to a third aspect of the present invention, there is provided a lens barrel which includes a fixed frame, a rotation frame disposed to be rotatable around an optical axis, an urging member held by one of the fixed frame and the rotation frame, and a moving member urged by the urging portion and disposed to be movable in an optical axis direction, in which another one of the fixed frame and the rotation frame has a first surface and a second surface, and the urging member changes in amount of deflection or total length between a state in which the moving member is in contact with the first surface and a state in which the moving member is in contact with the second surface.

According to a fourth aspect of the present invention, there is provided a lens barrel which includes a fixed frame, a rotation frame disposed to be rotatable around an optical axis, an urging member held by one of the fixed frame and the rotation frame, and a moving member, which is disposed to be movable in an optical axis direction, transfers an urging force of the urging member to another one of the fixed frame and the rotation frame.

According to a fifth aspect of the present invention, there is provided a lens barrel which includes a first member, a second member having a relationship of relative movement between a first member and the second member at least in a first direction, an urging member held by one of the first member and the second member, and a moving member which is disposed to be movable at least along another one of the first member and the second member, and transfers an urging force of the urging member to the another one.

According to a sixth aspect of the present invention, there is provided a lens barrel which is switchable between a photographing state and a contracted state, the lens barrel including: a first frame, a second frame which is rotatable relative to the first frame, an urging portion held by one of the first frame and the second frame and having an urging force in a contracting direction, and a contact portion which is urged by the urging portion and is able to come into contact with another one of the first frame and the second frame.

According to a seventh aspect of the present invention, there is provided a lens barrel which includes a first frame, a second frame which is rotatable relative to the first frame, an urging portion held by one of the first frame and the second frame, and a contact portion which is able to come into surface-contact with another one of the first frame and the second frame by the urging portion.

According to an eighth aspect of the present invention, there is provided an imaging apparatus which includes the aforementioned lens barrel, and a main body including an image pickup element.

DESCRIPTION OF EMBODIMENTS

Hereinafter, a plurality of embodiments will be described. The drawings and description are not intended to limit the invention to the particular forms disclosed, but are merely exemplary and are intended to indicate the subject matter disclosed in the claims for the understanding of those skilled in the art.

Figure 1:
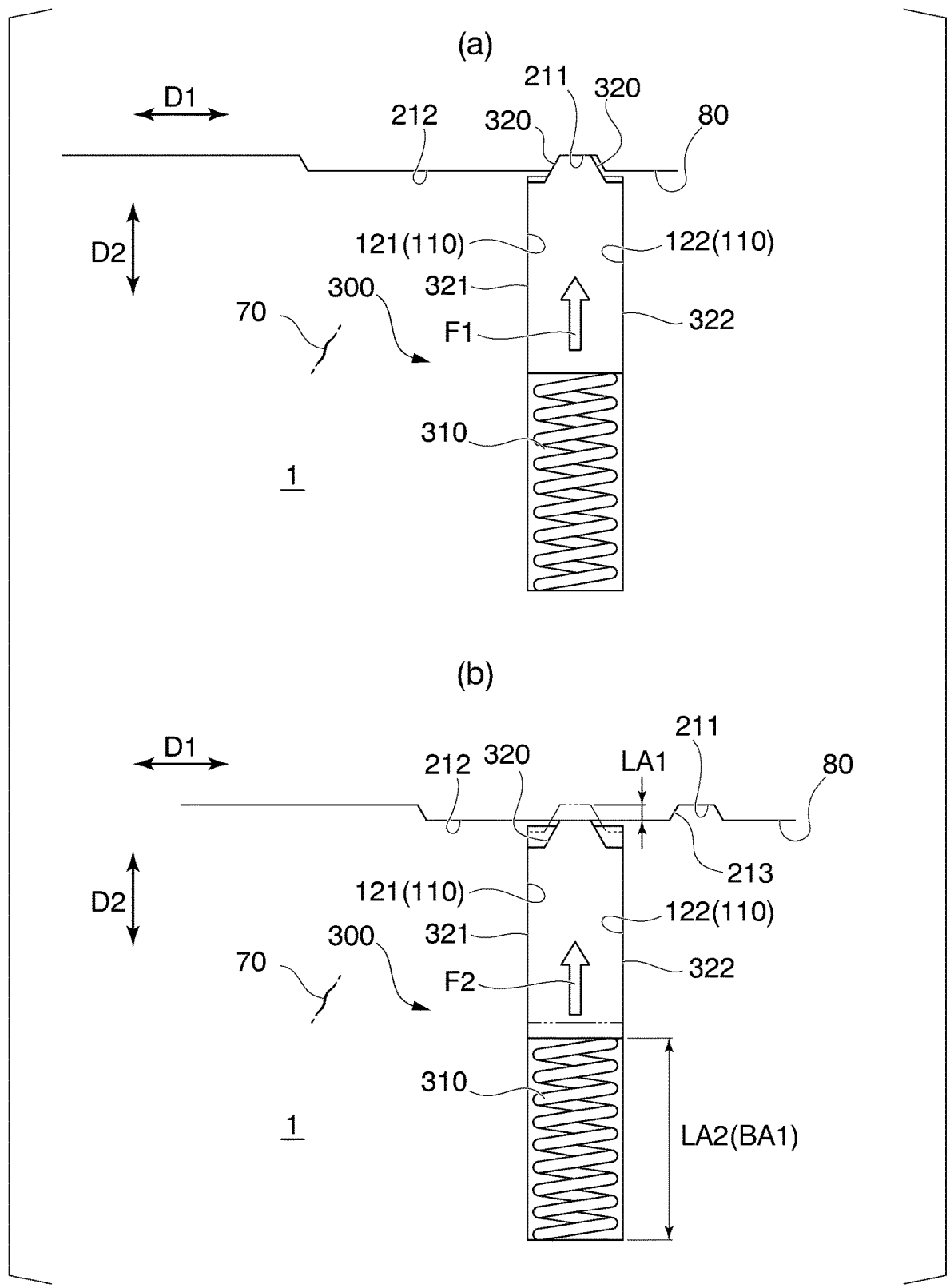
FIG. 1 is a schematic view showing a configuration of a main part of a lens barrel.

FIG. 1 shows a general configuration of a lens barrel 1. As shown in FIG. 1, the lens barrel 1 includes a first member (first frame) 70, a second member (second frame) 80, and an urging mechanism 300. The urging mechanism 300 has an urging member 310 and a moving piece (moving member) 320.

The first member 70 and the second member 80 have a relatively movable relationship between the first member 70 and the second member 80 at least in a D1 direction (a first direction). The D1 direction can be set in any direction with respect to an optical axis direction of the lens barrel 1. In an embodiment, the D1 direction is parallel to a predetermined plane that intersects or is perpendicular to the optical axis direction (a contraction direction, a thrust direction, or a longitudinal direction) of the lens barrel 1. Alternatively, the D1 direction is parallel to a radial direction (a lateral direction) of the lens barrel 1. In another embodiment, the D1 direction is parallel to the optical axis direction (the contraction direction, the thrust direction, or the longitudinal direction) of the lens barrel 1. Alternatively, the D1 direction is parallel to a predetermined plane that intersects or is perpendicular to the radial direction (the lateral direction) of the lens barrel 1. For example, the D1 direction can be a circumferential direction around the optical axis, a circumferential direction around a predetermined axis different from the optical axis, a linear direction intersecting the optical axis, a linear direction inclined with respect to the optical axis, or a linear direction parallel to the optical axis.

The urging member (an urging portion, an urging body, or a spring) 310 is held by, supported by, and/or fixed to the first member 70. Any kind of spring can be applied as the urging member 310. For example, a coil spring (a compression coil spring or a tension coil spring), a leaf spring, a torsion spring, a gas spring (an air spring), a magnetic spring, or the like can be applied as the urging member 310. One type of urging member 310 may be used alone, or a plurality of types of urging member 310 may be used in combination. The urging member 310 is disposed on the first member 70 to exert urging forces (F1, F2).

In an embodiment, the axis of the urging member 310 is disposed along a D2 direction (a second direction). In another embodiment, the axis of the urging member 310 is disposed along a direction different from the D2 direction. The D2 direction is a direction that intersects the D1 direction or is perpendicular to the D1 direction. In an embodiment, the D2 direction is parallel to the optical axis direction of the lens barrel 1. In another embodiment, the D2 direction is parallel to a predetermined plane, which is inclined with respect to the optical axis direction of the lens barrel 1, is parallel to the radial direction of the lens barrel 1 or intersects the optical axis direction of the lens barrel 1, or a predetermined plane perpendicular to the optical axis direction. For example, the D2 direction can be a linear direction parallel to the optical axis, a linear direction inclined with respect to the optical axis, or a linear direction intersecting the optical axis.

The moving piece (a moving member, a contact portion, a contact piece, or a physical contact body) 320 is disposed to be movable at least in the D2 direction. In an embodiment, a movement axis of the moving piece 320 is disposed parallel to and/or coaxially with the axis of the urging member 310. In this case, it is advantageous for making the urging mechanism 300 compact and/or simplifying the configuration of the urging mechanism 300 in the direction intersecting the movement axis of the moving piece 320. In another embodiment, the movement axis of the moving piece 320 is disposed non-parallel to and/or non-coaxially with the axis of the urging member 310. In this case, it is advantageous for making the urging mechanism 300 compact in the direction along the movement axis of the moving piece 320.

The moving piece 320 receives the urging force exerted by the urging member 310. One or a plurality of urging members 310 are provided for one moving piece 320. Alternatively, one urging member 310 is provided for a plurality of moving pieces 320. The moving piece 320 is pushed toward the second member 80 by the force from the urging member 310. When the moving piece 320 comes into direct or indirect contact with the second member 80, a force from the urging member 310 acts on the second member 80 at least along the D2 direction. Such an acting force can be used, for example, to apply a load in the D2 direction to a specific member. The load in the D2 direction contributes to the user's feeling of operation when the user manually operates the holding force between the two members and/or the relative movement between the two members.

In FIG. 1, LA1 is a movement range of the moving piece 320 in the D2 direction (a movement length in the D2 direction, a maximum movement range, or a movement amount). LA2 is the length in the D2 direction corresponding to a region (a region BA1) set in the first member 70 for the urging member 310. For example, the region BA1 includes an arrangement region of the urging member 310, and LA2 is a distance (a maximum distance) from one end to the other end of the urging member 310 disposed in the region BA1 along the D2 direction.

In an embodiment, LA2 can be about 300, 400, 500, 600, 700, 800, 900, or 1000% or more of LA1. Alternatively, LA1 can be ⅓, ¼, ⅕, ⅙, 1/7, ⅛, 1/9, or 1/10 or less of LA2. The aforementioned numerical values are typical examples, and different numerical values can be applied in other examples.

In an embodiment, the urging mechanism 300 can have an urging member 310 having a relatively large spring length (a free length (a total length, or a free height)) in a no-load state, and a relatively small maximum width or outer diameter. In other words, by accepting the large free length of the urging mechanism 300, the slim size of the urging member 310 is realized. The slim-sized urging member 310 is preferably applied to a narrow-sized installation space, and is advantageous for a flexible design. The urging member 310 with a large free length is preferably applied under conditions of a high load. The lens barrel 1 is securely held by the high holding force using the urging mechanism 300. As a result, it is possible to omit or simplify the mechanisms and/or parts required for the conventional lens barrel, such as a zoom lock mechanism or a rattling removal mechanism of the related art.

In an embodiment, the urging member 310 is a compression coil spring, and when an outer diameter (or a maximum width) of the urging member 310 is set to LA3 (not shown), and the free length of the urging member 310 is set to LA4 (not shown), LA4 can be about 400, 600, 800, 1000, 1200, 1400, 1600, 1800, 2000, 3000, 4000% or more of LA3. Alternatively, LA3 can be ½, ¼, ⅙, ⅛, 1/10, 1/12, 1/14, 1/16, 1/18, 1/20, 1/30 or 1/40 or less of LA4. The aforementioned numerical values are typical examples, and different numerical values can be applied in other examples. Since a ratio of the free length to the outer diameter is high (a slim ratio), an urging member 310 that can cope with a high load and is slim is provided.

In an embodiment, the urging member 310 is a compression coil spring, and when a maximum deflection (a maximum use deflection, a maximum amount of deflection, or a total deflection) which is a displacement of the urging member 310 from the no-load state (free length) to the maximum operating position, is set to LA5 (not shown), the LA5 can be about 200, 300, 400, 500, 600, 700, 800, 900, or 1000% or more of LA1 (a moving range of the moving piece 320). Alternatively, LA1 can be ½, ⅓, ¼, ⅕, ⅙, ⅐, ⅛, ⅑, or ⅒ or less of LA5. The aforementioned numerical values are typical examples, and different numerical values can be applied in other examples. That is, the urging member 310 has a relatively large maximum deflection with respect to the moving range of the moving piece 320.

Here, when the ratio of LA5 to LA1 (an allowable deflection ratio) is set to be relatively high, the load change with respect to the change in the amount of deflection is suppressed. That is, a significant change in the load in response to a slight change in the position of the moving piece 320 in the D2 direction is avoided. For example, in the urging mechanism 300, the movement of the moving piece 320 can be smoothly absorbed by the urging member 310, while maintaining a high load state. The user's feeling of operation is improved with respect to the manual operation of the relative movement between the first member 70 and the second member 80, while maintaining high holdability, using the load (force) of the urging mechanism 300. The urging mechanism 300 is also advantageous for assembly and adjustment.

In an embodiment, the urging member 310 is disposed along the wall of the first member 70, and at least a part of the urging member 310 is disposed within the thickness range of the wall of the first member 70. Alternatively, a main extending direction of the overall shape of the urging member 310 is disposed along the extending direction of the wall of the first member 70, and at least a part of the urging member 310 is disposed inside the wall of the first member 70. In this embodiment, a protruding height of the urging mechanism 300 from the wall surface is suppressed, and the urging member 310 is prevented from unnecessarily interfering with other members.

In an embodiment, a hole (a slot, or a groove) 110 for the urging member 310 and the moving piece 320 is provided in the first member 70. The hole 110 may be a through hole or a non-through hole. Further, the hole 110 may have a groove shape provided at the end portion of the first member 70. The hole 110 for the urging member 310 and the hole 110 for the moving piece 320 may be connected to each other or may be provided separately. At least a part of the urging member 310 and at least a part of the moving piece 320 are disposed inside the hole 110. For example, all or most of the slim-sized urging member 310 may be accommodated in the hole 110. The shape of the hole 110 can be arbitrarily set. When the movement axis of the moving piece 320 is parallel and/or coaxial with the axis of the urging member 310, the hole 110 may have a simple shape and an opening area thereof may be minimized.

In an embodiment, the hole 110 has slide walls 121 and 122 that guide the movement of the moving piece 320. The moving piece 320 is restricted from moving in a direction intersecting the moving direction, by restricting portions provided on the slide walls 121 and 122. For example, the slide walls 121 and 122 have wall surfaces provided parallel to the movement axis of the moving piece 320, as the restricting portion. The moving piece 320 moves along the walls of the slide walls 121 and 122. The smooth movement of the moving piece 320 is realized by the slide walls 121 and 122.

In an embodiment, the moving piece 320 has slide surfaces 321 and 322 disposed to face the wall surfaces of the slide walls 121 and 122, respectively. The slide surfaces 321 and 322 are provided parallel to the movement axis of the moving piece 320. When the lengths of the slide walls 121 and 122 along the movement axis are set to LA6 (not shown), the LA6 can be about 300, 400, 500, 600, 700, 800, 900, or 1000% or more of LA1 (moving range of the moving piece 320 in the D2 direction). Alternatively, LA1 can be ⅓, ¼, ⅕, ⅙, ⅐, ⅛, ⅑, or ⅒ or less of LA6. The aforementioned numerical values are typical examples, and different numerical values can be applied in other examples. The movement of the moving piece 320 in the direction intersecting the moving direction is reliably restricted over the entire range of movement, by the slide surfaces 321 and 322. In the urging mechanism 300, although the configuration is simple, an occurrence of twisting when the moving piece 320 moves is avoided, and a smoother movement of the moving piece 320 is achieved.

In an embodiment, the moving piece 320 is made of a different material from the urging member 310. Also, the posture of the moving piece 320 can be restricted and/or controlled substantially independently of the urging member 310. That is, the posture of the moving piece 320 can be restricted and/or controlled with high accuracy. As a result, as will be described later, surface-contact between the first member 70 and the second member 80 is surely achieved. Alternatively, highly accurate torque control for relative movement, which will be described later, is reliably achieved.

The moving piece 320 can be positioned in the D2 direction by coming into direct or indirect contact with the second member 80 or another member different from the second member 80. The amount of deflection of the urging member 310 (and the urging force (spring load) of the urging member 310) changes depending on the change in the position of the moving piece 320 in the D2 direction.

In an embodiment, the second member 80 has a first surface 211 and a second surface 212 whose positions in the D1 direction (first direction) are different from each other. The first surface 211 and the second surface 212 are each parallel with the D1 direction, and their positions in the D2 direction (second direction) are different from each other. In part (a) of FIG. 1, the urging member 310 exerts an urging force F1 in a state in which the moving piece 320 is in contact with the first surface 211. Further, a force (an operating force, or a torque) T1 is required for the relative movement between the first member 70 and the second member 80. Further, the moving piece 320 and the first surface 211 can be brought into contact with each other on a surface. By the contact on the surface, the urging force F1 can be efficiently transferred to the second member 80. In part (b) of FIG. 1, in a state in which the moving piece 320 is in contact with the second surface 212, the urging member 310 with an increased amount of deflection exerts a larger urging force F2 than F1. In other words, the urging force F1 of the urging member 310 in the state in which the moving piece 320 is in contact with the first surface 211 is smaller than the urging force F2 of the urging member 310 in the state in which the moving member 320 is in contact with the second surface 212. Similarly, the urging force of the urging member 310 in the state in which the moving piece 320 is in contact with a fifth surface 215, which will be described later, is smaller than the urging force of the urging member 310 in the state in which the moving member 320 is in contact with the second surface 212. Further, a force (an operating force, and a torque) T2 greater than T1 is required for the relative movement between the first member 70 and the second member 80. Further, the moving piece 320 and the second surface 212 can be brought into contact with each other on a surface. By the contact on the surface, the urging force F2 can be efficiently transferred to the second member 80.

In an embodiment, the second member 80 further has a third surface 213 disposed between the first surface 211 and the second surface 212 in the D1 direction. The third surface 213 has an inclined surface which is inclined with respect to the first surface 211 and the second surface 212, and functions as a transition region between the first surface 211 and the second surface 212. In other words, the second member 80 has a third surface 213 that connects the first surface 211 and the second surface 212 and is inclined with respect to the optical axis direction. In the transition from the state of part (a) of FIG. 1 to the state of part (b) of FIG. 1, due to the relative movement between the first member 70 and the second member 80, a force T3 (a switching operation force, or a switching torque) greater than T1 is required. By utilizing the aforementioned urging member 310 that copes with a high load, the switching operation force is set high, and as a result, the mechanism and/or parts required for the conventional lens barrel such as the conventional zoom lock mechanism can be omitted. Further, the moving piece 320 and the third surface 213 can be brought into contact with each other in surface-contact manner. By the contact on the surface, the urging force in the D2 direction can be efficiently transferred to the second member 80. Further, the moving piece 320 can efficiently generate the force T3 required when moving from the first surface 211 to the second surface 212, or can appropriately adjust the force T3.

Figure 2:
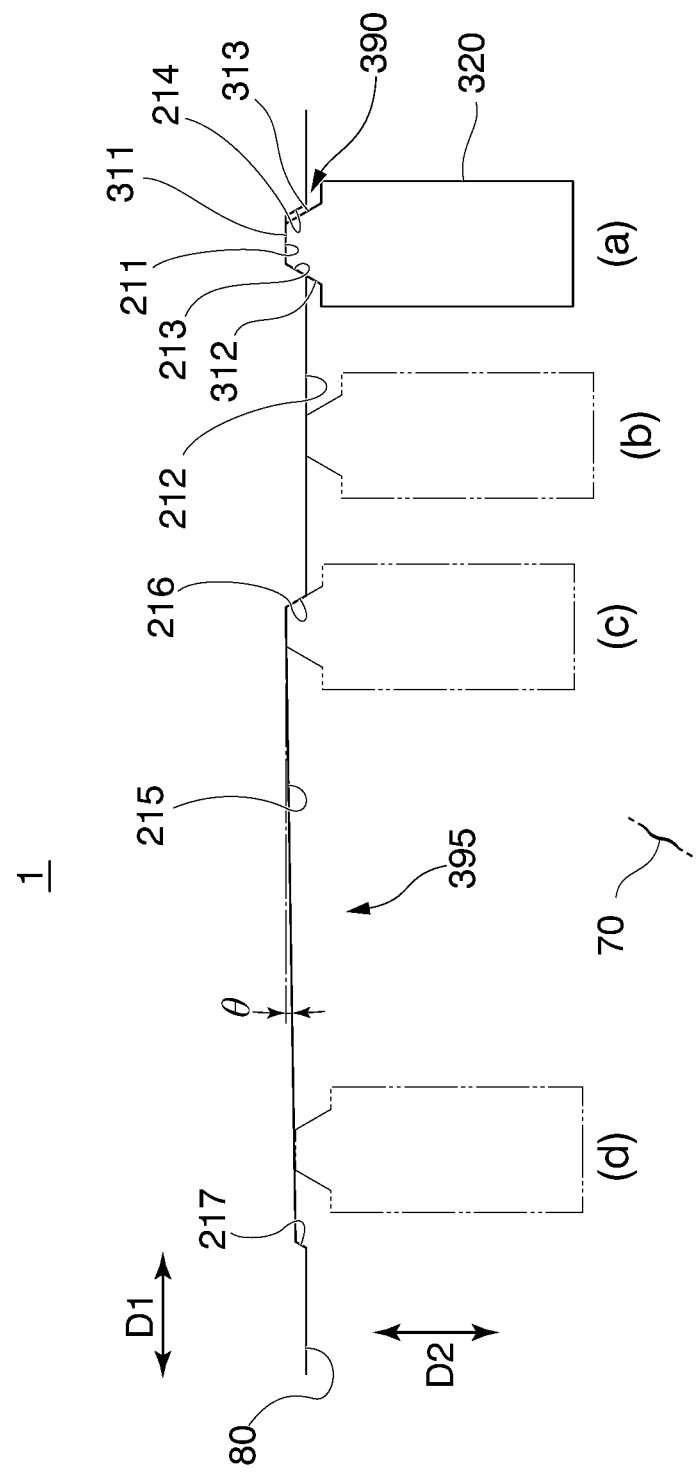
FIG. 2 is a schematic diagram showing the relative movement of a moving piece.

In the example of FIG. 2, the second member 80 has a first surface 211, a second surface 212, a third surface 213, a fourth surface 214, a fifth surface 215, a sixth surface 216 and a seventh surface 217 whose positions in the D1 direction are different from each other. Along the D1 direction, the fourth surface 214, the first surface 211, the third surface 213, the second surface 212, the sixth surface 216, the fifth surface 215, and the seventh surface 217 are disposed in this order. The first surface 211 and the second surface 212 are substantially parallel to each other in the D1 direction, and their positions in the D2 direction are different from each other. The third surface 213 has an inclined surface inclined with respect to the D1 direction, and functions as a transition region between the first surface 211 and the second surface 212. The fourth surface 214 has an inclined surface inclined with respect to the D1 direction. The direction of inclination of the fourth surface 214 is different from the direction of inclination of the third surface 213.

The moving piece 320 has a first surface 311, a second surface 312 and a third surface 313. The first surface 311 is disposed parallel to the D1 direction. The second surface 312 has an inclined surface inclined with respect to the D1 direction. The third surface 313 has an inclined surface inclined with respect to the D1 direction. The moving piece 320 has a protruding portion protruding from the main body in the D2 direction, and the first surface 311, the second surface 312, and the third surface 313 are formed in the protruding portion. The direction of inclination of the second surface 312 is different from the direction of inclination of the third surface 313. For example, the second surface (inclined surface) 312 of the moving piece 320 is disposed parallel to the third surface (inclined surface) 213 of the second member 80. Alternatively, the inclination of the third surface 213 of the second member 80 with respect to the urging direction of the urging member 310 is substantially parallel to the inclination of the second surface 312 of the moving piece 320 with respect to the urging direction of the urging member 310. In other words, the third surface 213 and the second surface 312 are substantially parallel to each other. Further, the third surface (inclined surface) 313 of the moving piece 320 is disposed parallel to the fourth surface (inclined surface) 214 and the sixth surface (inclined surface) 216 of the second member 80. In other words, each of the fourth surface 214 and the sixth surface 216 is substantially parallel to the third surface 313. Since the two surfaces that come into contact with each other are disposed parallel to each other, substantial surface-contact between the second member 80 and the moving piece 320 is achieved. For example, in surface-contact, the two surfaces come closer to each other due to the relative movement between the two surfaces, while maintaining the state in which the two surfaces are disposed in parallel, and then the two surfaces come into contact with each other. The surface-contact contributes to the improvement of the user's feeling of operation with respect to the manual operation of the relative movement between the first member 70 and the second member 80. In another example, the two surfaces making the surface-contact can have a shape other than a flat surface. In addition, at least a part of the surface of a contact target can be subjected to a predetermined surface treatment for the purpose of smoothness improvement, slipperiness improvement, wear prevention, soundproofing, and/or noise reduction.

The fifth surface 215 of the second member 80 has an inclined surface (an inclination angle θ) slightly inclined with respect to the D1 direction. In a state in which the moving piece 320 is in contact with the fifth surface 215 of the second member 80, when the moving piece 320 moves relative to the second member 80 from a state "(c)" to a state "(d)", the position of the moving piece 320 in the D2 direction gradually changes, and the urging force received from the urging member 310 (FIG. 1) gradually increases accordingly.

The sixth surface 216 and the seventh surface of the second member 80 each have an inclined surface inclined with respect to the D1 direction. In other words, the sixth surface 216 has an inclined surface inclined with respect to the second surface 212 and the fifth surface 215, and functions as a transition region between the second surface 212 and the fifth surface 215. The second member 80 has a sixth surface 216 that connects the second surface 212 and the fifth surface 215 and is inclined with respect to the optical axis direction. The direction of inclination of the sixth surface 216 is different from the direction of inclination of the seventh surface. For example, the sixth surface (inclined surface) 216 is disposed parallel to the fourth surface (inclined surface) 214. The seventh surface (inclined surface) 217 is disposed parallel to the third surface (inclined surface) 213. The inclination of the sixth surface 216 has the same gradient as that of the inclination of the seventh surface. Alternatively, the inclination of the sixth surface 216 has a gradient different from the gradient of the inclination of the seventh surface.

Figure 3:
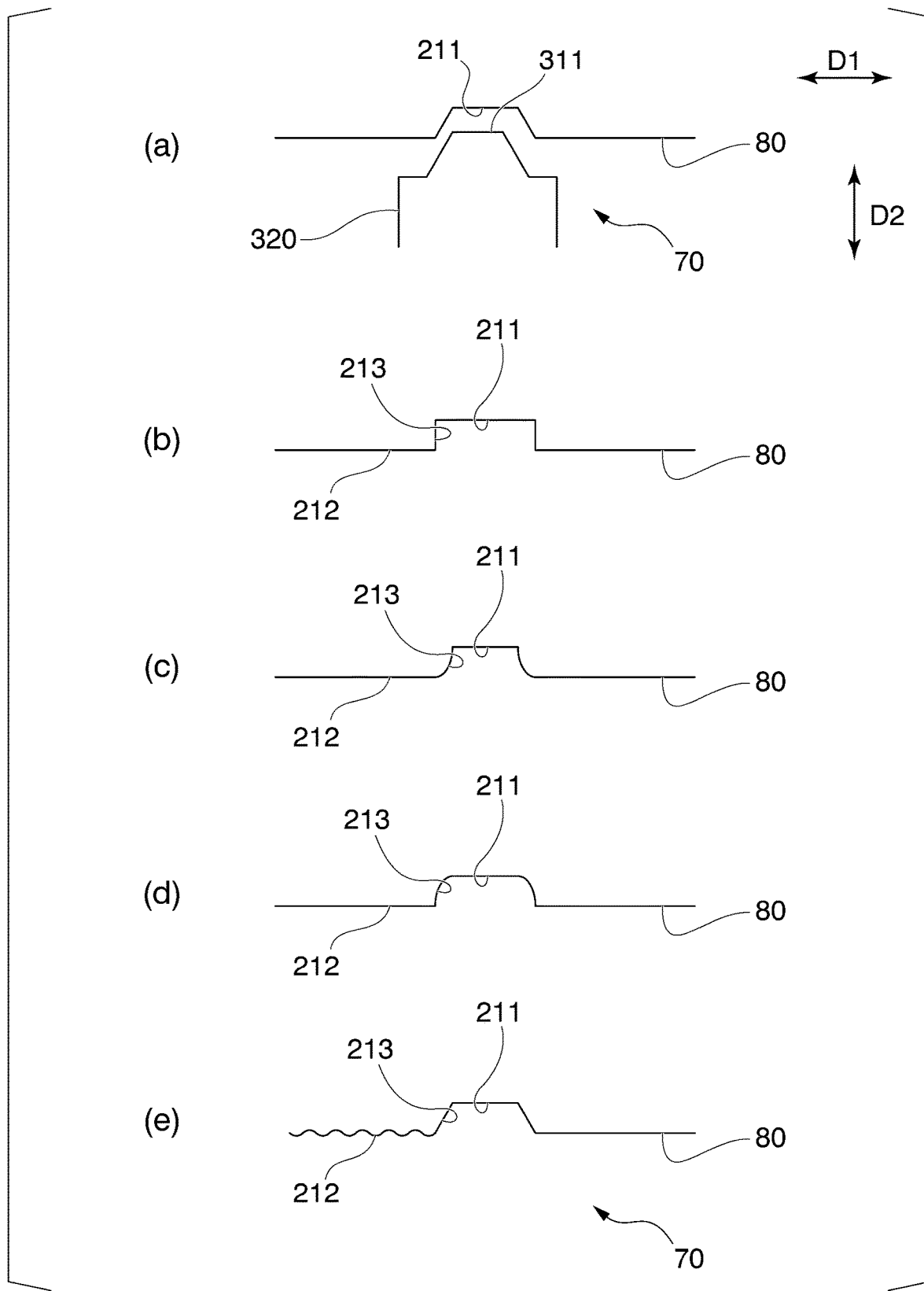
FIG. 3 is a diagram showing an example of a shape of a recess provided in a second member and/or a shape of the moving piece.

In the example of part (a) of FIG. 3, the moving piece 320 is positioned with respect to the second member 80 in a non-contact state. A gap is provided in the D2 direction between the first surface 211 of the second member 80 and the first surface 311 of the moving piece 320. In this case, since the first surface 211 of the second member 80 and the first surface 311 of the moving piece 320 do not come into contact with each other, it is possible to avoid generating an extra force in the D2 direction. Further, if the third surface 213 of the second member 80 and the second surface 312 of the moving piece 320 are brought into contact with each other, even when the first surface 211 and the first surface 311 do not come into contact with each other, a force in the D2 direction can be generated. This state is realized by bringing the moving piece 320 into contact with the first member 70 or a third member different from the first member 70 and the second member 80. In a predetermined state, the urging force of the urging member 310 (FIG. 1) is prevented from acting on the second member 80.

In the example of part (b) of FIG. 3, the third surface 213, which is a transition region between the first surface 211 and the second surface 212 of the second member 80, is disposed perpendicular to the D1 direction. In this case, the force T3 required when the moving piece 320 moves from the first surface 211 to the second surface 212 can be set to be large.

In the example of part (c) of FIG. 3, the third surface 213, which is a transition region between the first surface 211 and the second surface 212 of the second member 80, has a convex contour. By changing the convex shape of the third surface 213, the force T3 required when the moving piece 320 moves from the first surface 211 to the second surface 212 can be adjusted.

In the example of part (d) of FIG. 3, the third surface 213, which is a transition region between the first surface 211 and the second surface 212 of the second member 80, has a concave contour. By changing the concave shape of the third surface 213, the force T3 required when the moving piece 320 moves from the first surface 211 to the second surface 212 can be adjusted.

In the example of part (e) of FIG. 3, the second surface 212 of the second member 80 has a non-smooth surface. For example, the second surface 212 has a surface that has been roughened. Alternatively, a plurality of protruding portions, holes, grooves, and/or recesses are provided in the second surface 212. Such a form contributes to the user's recognition of a change in the feeling of operation with respect to the manual operation of the relative movement between the first member 70 and the second member 80. In another example, another surface different from the second surface 212 can have a non-smooth surface.

Figure 4:
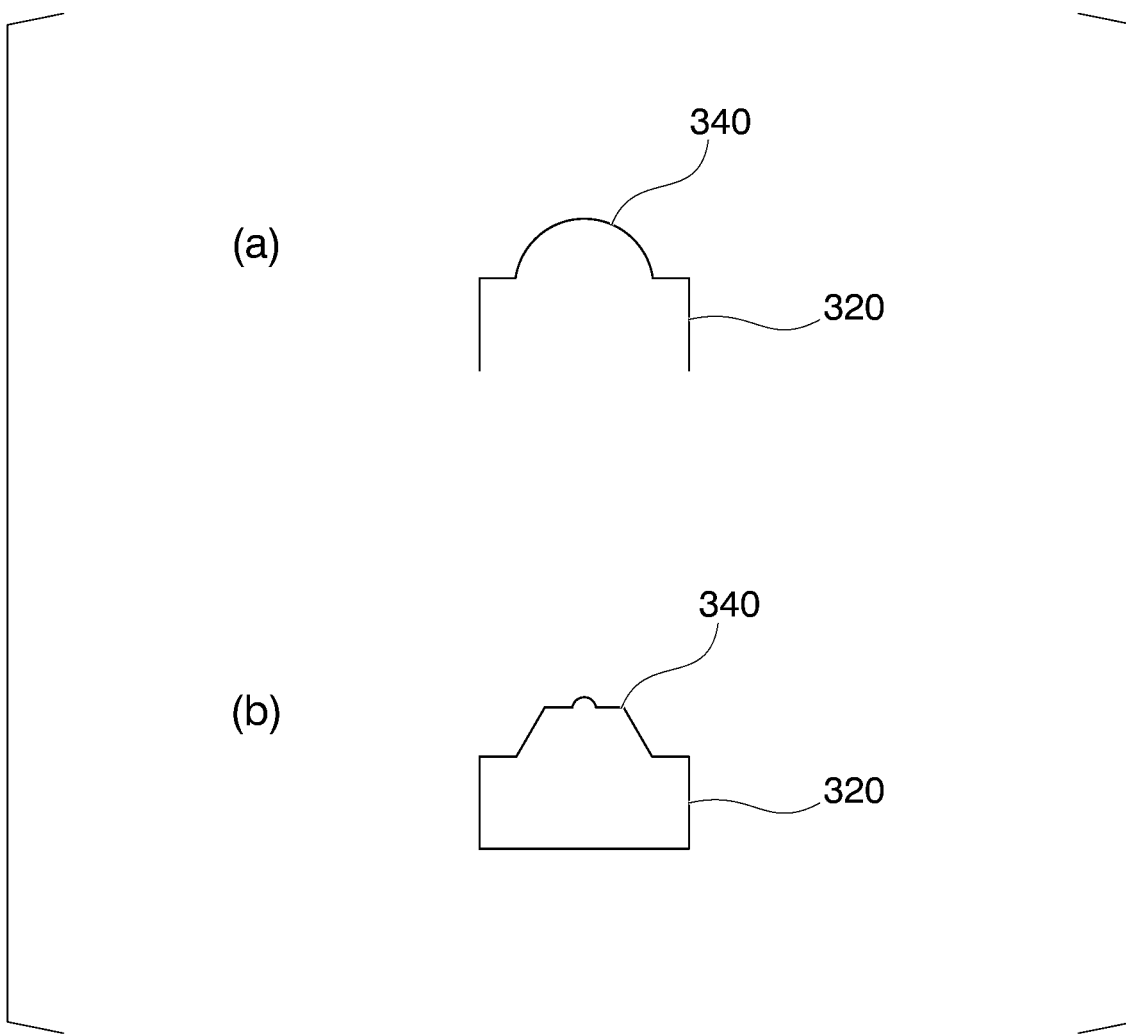
FIG. 4 is a diagram showing an example of a shape of a protruding portion of the moving piece.

In the example of part (a) of FIG. 4, the protruding portion (contact portion) 340 of the moving piece 320 has an overall convex contour.

In the example of part (b) of FIG. 4, the protruding portion (contact portion) 340 of the moving piece 320 has a partial convex contour.

Next, an example in which the lens barrel 1 is applied to an interchangeable lens that can be attached to and detached from the camera body will be described.

Figure 5:
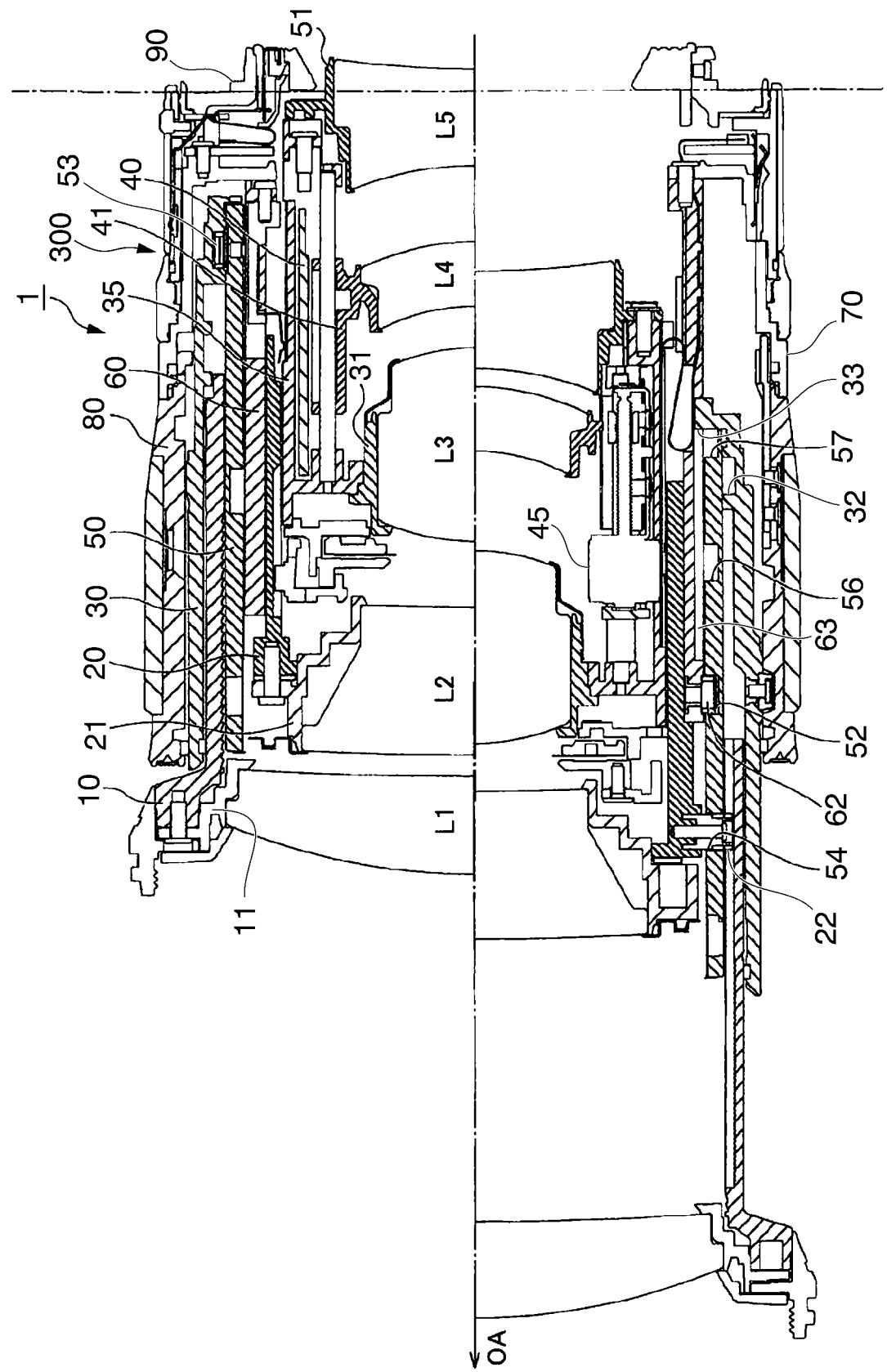
FIG. 5 is a cross-sectional view showing a telephoto end photographing state and a retracted state of the lens barrel.
Figure 13:
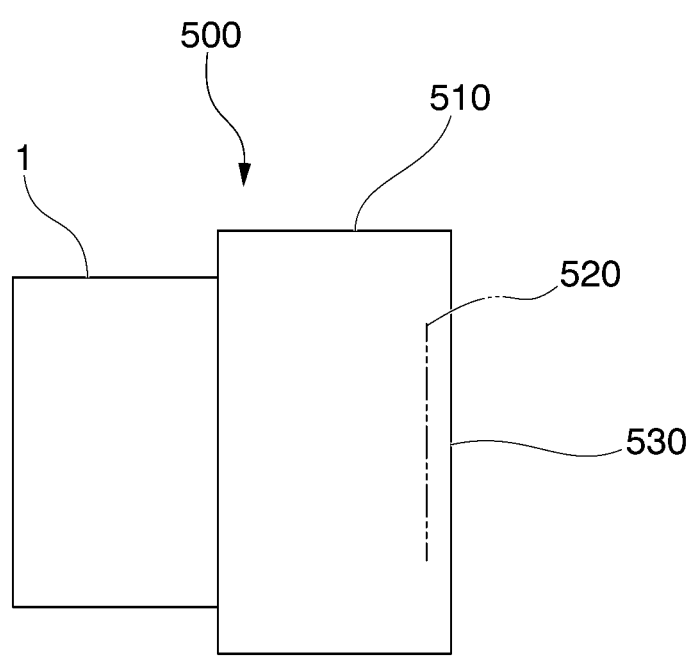
FIG. 13 is a diagram schematically showing an example of a camera (imaging apparatus).

FIG. 5 is a cross-sectional view showing a telephoto end photographing state and a retracted state (a contracted state, or a standby state) of the lens barrel 1. In FIG. 5, an upper half of a paper surface shows the lens barrel 1 in the retracted state, and a lower half of the paper surface shows the lens barrel 1 in the telephoto end photographing state. The lens barrel 1 is attachable to and detachable from the camera body. In another example, the lens barrel 1 may be a camera that is fixed to the camera body and not attachable and detachable. In an example of the camera (imaging apparatus) 500 shown in FIG. 13, the camera body (main body) 510 includes an image sensor 520, a display unit 530, and the like.

In FIG. 5, the lens barrel 1 includes a variable magnification optical system including a plurality of lens groups. The lens barrel 1 is equipped with a zoom lens including a first group lens L1, a second group lens L2, a third group lens L3, a fourth group lens L4, and a fifth group lens L5. From a subject side to an image plane side, the first group lens L1, the second group lens L2, the third group lens L3, the fourth group lens L4, and the fifth group lens L5 are disposed in this order.

The first group lens L1, the second group lens L2, the third group lens L3, the fourth group lens LA, and the fifth group lens L5 move in the optical axis direction when zooming. The fourth group lens LA includes a focus lens, and moves in the optical axis direction when focusing.

Further, the lens barrel 1 is equipped with a first moving barrel 10, a second moving barrel 20, a rectilinear-moving barrel 30, a third moving barrel 35, a fourth moving barrel 40, and a cam barrel (a third frame) 50. A fixed barrel 60, a fixed frame (a first member, and a first frame) 70, a zoom ring (a second member, a rotation frame, and a second frame) 80, and a mount 90 are provided.

The first moving barrel 10 is movable with respect to the fixed frame 70 along the optical axis (OA). The second moving barrel 20 is movable with respect to the fixed frame 70 along the optical axis. The rectilinear-moving barrel 30 is movable with respect to the fixed frame 70 along the optical axis. The third moving barrel 35 is movable with respect to the fixed frame 70 along the optical axis. The fourth moving barrel 40 is movable with respect to the fixed frame 70 along the optical axis. The cam barrel 50 is rotatable about the optical axis with respect to the fixed frame 70, and is movable with respect to the fixed frame 70 along the optical axis.

The first group lens L1 is held by the first lens frame 11. The first lens frame 11 is held by the first moving barrel 10.

The second group lens L2 is held by the second lens frame 21. The second lens frame 21 is held by the second moving barrel 20.

The third group lens L3 is held by the third lens frame 31. The fifth group lens L5 is held by the fifth lens frame 51. The third lens frame 31 and the fifth lens frame 51 are held by the third moving barrel 35. In another example, the third group lens L3 and the fifth group lens L5 are held by separate moving barrels and can be configured to be independently movable.

The fourth group lens LA is held by the fourth lens frame 41. The fourth lens frame 41 is held by the fourth moving barrel 40.

The fixed barrel 60 is held by the fixed frame 70. The fixed frame 70 is held by the mount 90. The mount 90 is held by the camera body. The lens barrel 1 is connected to the camera body via the mount 90.

The zoom ring 80 is rotatable around the optical axis within a predetermined range with respect to the fixed frame 70. The zoom ring 80 is rotatable by a user (photographer).

The cam barrel 50 has a zoom interlocking pin (not shown) that engages with a linear groove (not shown) provided on the zoom ring 80. The cam barrel 50 is disposed at an inner peripheral side with respect to the fixed frame 70 and/or the zoom ring 80. Further, the cam barrel 50 has a cam groove 52 that engages with a cam follower 62 provided in the fixed barrel 60. As the zoom ring 80 rotates, the cam barrel 50 rotates around the optical axis and moves along the optical axis.

The rectilinear-moving barrel 30 has a circumferential groove 32 that engages with a connecting pin 53 provided on the cam barrel 50. Further, the rectilinear-moving barrel 30 has a key 33 that engages with a linear groove 63 provided in the fixed barrel 60. The rectilinear-moving barrel 30 moves along the optical axis without rotation, with movement of the cam barrel 50 in the optical axis direction.

The second moving barrel 20 has a cam follower 22 that engages with a cam groove 54 provided in the cam barrel 50. Further, the second moving barrel 20 has a key (not shown) that engages with a linear groove (not shown) provided in the fixed barrel 60. The second moving barrel 20 moves along the optical axis without rotation, with the rotation of the cam barrel 50.

The first moving barrel 10 has a cam follower (not shown) that engages with a cam groove (not shown) provided in the cam barrel 50. Further, the first moving barrel has a connecting pin (not shown) that engages with a linear groove (not shown) provided in the rectilinear-moving barrel 30. The first moving barrel 10 moves along the optical axis without rotation, with the rotation of the cam barrel 50.

The third moving barrel 35 has a cam follower (not shown) that penetrates the fixed barrel 60 and engages with the cam groove 56 provided in the cam barrel 50. Further, the third moving barrel 35 has a key (not shown) that engages with a linear groove (not shown) provided in the second moving barrel 20. The third moving barrel moves along the optical axis without rotation, with the rotation of the cam barrel 50.

The fourth moving barrel 40 has a cam follower (not shown) that penetrates the third moving barrel 35 and engages with the cam groove 57 provided in the cam barrel 50. Further, the fourth moving barrel 40 has a key (not shown) that engages with a linear groove (not shown) provided in the third moving barrel 35. The fourth moving barrel 40 moves along the optical axis without rotation, with the rotation of the cam barrel 50.

Further, an actuator (a focus motor) 45 and a position detection unit (a position sensor) (not shown) are provided in the fourth moving barrel 40. The fourth group lens L4 and the fourth lens frame 41 are movable along the optical axis by the actuator 45, in addition to the movement accompanying the rotation of the zoom ring 80. As the actuator 45, for example, a stepping motor is applied. In another example, the actuator can be an ultrasonic motor, a voice coil motor, a piezoelectric actuator, a linear actuator, or the like. The position detection unit includes, for example, a photo interrupter.

A focal length of the lens barrel 1 changes by zooming. Also, a photographing distance (or a focus position) of the lens barrel 1 changes by focusing. The photographing distance is a distance from the camera to the subject. More specifically, the photographing distance is the distance from a reference position of the camera to a focused subject. The focus position is a position of the focused subject.

The lens barrel 1 is a so-called inner focus type in which a fourth group lens LA including a focus lens is disposed between a third group lens L3 and a fifth group lens L5 which is a zoom lens.

Further, the lens barrel 1 is able to switch the photographing mode between a normal photographing state (a non-contracted state) including a telephoto side state (a telephoto state) and a wide-angle side state (a wide state), and a non-photographing state (a contracted state) including a retracted state. These states are switched through the rotation operation of the zoom ring 80 by the user. In the normal photographing state, the focal length is changed by the rotation operation of the zoom ring 80 between the telephoto end and the wide-angle end.

The lens barrel 1 can be equipped with the urging mechanism 300 as described above for the purpose of appropriately controlling the operating torque of the zoom ring 80. In the description using FIGS. 1 and 2, an example in which the fixed frame 70 is applied as the first member 70 and the zoom ring 80 is applied as the second member 80 will be described. The zoom ring 80 may be applied as the first member 70, and the fixed frame 70 may be applied as the second member 80.

In FIG. 2, part (a) shows a retracted state, part (b) shows a switching state, part (c) shows a wide end state in a photographing mode, and part (d) shows a telephoto end state in the photographing mode. In the switching state, the photographing mode is switched between the normal photographing state (a photographing mode, or a usage state) and the non-photographing state (a retracted state, or a standby state). The D1 direction is the circumferential direction around the optical axis, and the D2 direction is a direction along the optical axis (an optical axis direction).

Figure 6:
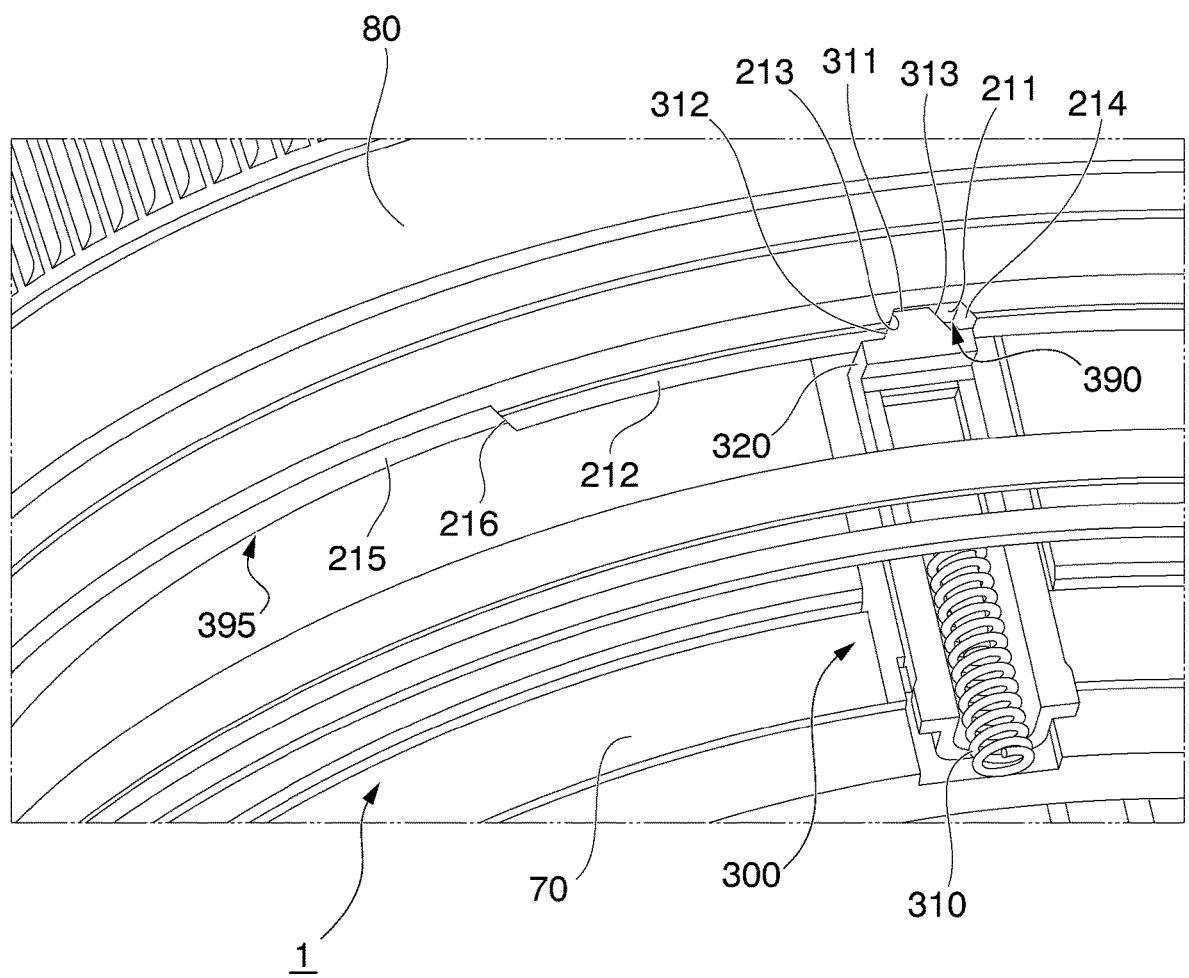
FIG. 6 is a schematic diagram showing an urging mechanism.

In the retracted state of FIG. 2(a), the moving piece 320 is in contact with the first surface 211 and/or the third surface 213 of the zoom ring 80. As shown in FIG. 6, at the axial end portion (an axial end surface) of the zoom ring 80, a recess 390 surrounded by the first surface 211, the second surface 212, and the third surface 213 is formed, and a tip portion of the moving piece 320 is accommodated inside the recess 390. In this state, the urging force (load) of the urging member 310 acts on the moving piece 320 in the optical axis direction. The moving piece 320 is movably held by the urging member 310 in the direction in which the lens barrel 1 is contracted (the optical axis direction). The urging member 310 is a compression coil spring. The urging member 310 is disposed in the urging mechanism 300 under high load conditions.

In order for the moving piece 320 to ride over the step of the recess 390 of the zoom ring 80, there is a need for a strong force (a first switching operation force, or a first switching torque) for rotating the zoom ring 80 in the circumferential direction. In this lens barrel 1, the switching torque is set to be high by the use of a high urging force (high load) in the optical axis direction, and the conventional zoom lock mechanism is omitted. That is, even when a camera equipped with a relatively large lens barrel 1 is disposed so that the front lens faces downward (for example, when the camera body is hung from the neck or shoulder), the movement of the moving piece 320 is restricted by the third surface 213 or the fourth surface 214. As a result, protrusion of the lens in the lens barrel 1 due to its own weight is prevented. Omission of the conventional zoom lock mechanism is advantageous for making the lens barrel 1 compact and improving the design. If a high load is applied in the radial direction of the lens barrel 1, there is a risk of distortion of the lens barrel 1. Application of the load in the optical axis direction is also advantageous in terms of suppressing distortion of the lens barrel 1.

In FIG. 2(a), when the user turns the zoom ring 80 with a strong force, the second surface 312 of the moving piece 320 moves relatively along the wall surface (the third surface 213) of the recess 390 of the zoom ring 80, and the moving piece 320 rides on the second surface 212 of the zoom ring 80 (FIG. 2(b)).

In the switching state (transition state) of FIG. 2(b), since a predetermined lens is fed forward when the user turns the zoom ring 80, the lens barrel 1 enters the switching region to the normal photographing state (the photographing mode, or the usage state) from the non-photographing state (the retracted state, or the standby state). At this time, the moving piece 320 slides on the second surface 212 of the zoom ring 80. The force (torque) for rotating the zoom ring 80 in the circumferential direction is smaller than the first switching torque described above.

In the wide end state of FIG. 2(c), the moving piece 320 is in contact with the fifth surface 215 and/or the sixth surface 216 of the zoom ring 80. A recess surrounded by the fifth surface 215, the sixth surface 216, and the seventh surface 217 is formed at the axial end portion (the axial end surface) of the zoom ring 80, and the tip portion of the moving piece 320 is accommodated inside the recess. In this state, the urging force of the urging member 310 acts on the moving piece 320 in the optical axis direction, and the zoom ring 80 is pushed in the optical axis direction by the moving piece 320. As described above, the zoom ring 80 engages with the cam barrel 50 (see FIG. 5). The urging member 310 can urge the cam barrel 50 in the contracting direction (the optical axis direction) at least via the moving piece 320 and the zoom ring 80. The force in the optical axis direction received by the zoom ring 80 is transferred to the cam barrel 50. In other words, the urging member 310 urges the cam barrel 50 in the optical axis direction via the moving piece 320 and the zoom ring 80. Further, the force in the optical axis direction can be transferred to another frame or barrel via the cam barrel 50. As a result, misalignment (an occurrence of rattling) of the members in the optical axis direction due to the gap between the members is prevented. This is advantageous for improving the optical performance of the lens barrel 1. Further, since the urging force due to the urging member 310 changes when changing from the switching state of FIG. 2(b) to the wide end state of FIG. 2(c), it can be seen that the user switches to the normal photographing state. In the urging direction of the urging member 310, the zoom ring 80 has a first surface 211 having a first distance as a distance from the fixed frame 70, a second surface 212 having a second distance, a fifth surface 215 having a third distance, a third surface 213 disposed between the first surface 211 and the second surface 212, and a sixth surface 216 disposed between the second surface 212 and the fifth surface 215. The moving piece 320 can be in surface-contact with at least one of the second surface 212, the third surface 213, and the sixth surface 216. The moving piece 320 has a first surface 311 that can come into contact with at least one of the first surface 211, the second surface 212 and the fifth surface 215, a second surface 312 that can come into contact with the third surface 213, and a third surface 313 that can come into contact with sixth surface 216. In other words, the moving piece 320 has a first surface 311 that can be in surface-contact with at least one of the first surface 211, the second surface 212 and the fifth surface 215, a second surface 312 that can be in surface-contact with the third surface 213, and a third surface 313 that can be in surface-contact with the sixth surface 216.

In FIG. 2(c), when the user turns the zoom ring 80, the predetermined lens is further fed forward, and the zoom operation is executed. In the zoom operation, the state in which the moving piece 320 is pressed against the zoom ring 80 is maintained. The misalignment of the zoom ring 80 in the optical axis direction is prevented in the user's zoom operation. This is advantageous for improving the user's feeling of operation. Further, the force received by the zoom ring 80 in the optical axis direction can be continuously transferred to another frame or barrel via the cam barrel 50. As a result, even at the time of the zoom operation, misalignment of the members (an occurrence of rattling) in the optical axis direction due to the gap between the members is prevented. This is advantageous for improving the optical performance of the lens barrel 1.

Further, in FIG. 2(c), the fifth surface 215 of the zoom ring 80 is slightly inclined with respect to the D1 direction (the surface perpendicular to the optical axis direction). Therefore, at the time of the zoom operation, a surface-contact between the moving piece 320 and the fifth surface of the zoom ring 80 is avoided, and there is a state close to line contact. The moving piece 320 can slide relatively smoothly with respect to the zoom ring 80. This is advantageous for improving the user's feeling of operation and improving the optical performance of the lens barrel 1.

In the zoom from the wide end state of FIG. 2(c) to the telephoto end state of FIG. 2(d), the urging force (load) received by the moving piece 320 from the urging member 310 gradually increases. Such a load change can be set depending on the movement of the lens when zooming. For example, a height profile of the fifth surface 215 can be set depending on the locus of the cam groove of the predetermined barrel. In an example, the height profile of the fifth surface 215 can be set so that the operating torque of the zoom ring 80 recognized by the user gradually increases from the wide end to the telephoto end. In another example, the height profile of the fifth surface 215 can be set so that the operating torque of the zoom ring 80 recognized by the user is constant between the wide end and the telephoto end.

In the operation of returning from the telephoto end state of FIG. 2(d) to the retracted state of FIG. 2(a), the user turns the zoom ring 80 in an opposite direction. In switching from the normal photographing state to the non-photographing state, in order for the moving piece 320 to ride on the step of the recess 395 of the zoom ring 80, there is a need for a strong force for rotating the zoom ring 80 in the circumferential direction (a second switching operation force, or a second switching torque). Here, the inclined surface of the sixth surface 216 of the zoom ring 80 can have a gradient different from the inclined surface of the third surface 213. In other words, the sixth surface 216 is connected to the second surface 212 at the side opposite to the third surface 213 and is inclined with respect to the optical axis direction. Or, the third surface 213 is connected to the second surface 212 at the side opposite to the sixth surface 216 and is inclined with respect to the optical axis direction. The inclination of the sixth surface 216 with respect to the optical axis direction is different from the inclination of the third surface 213 with respect to the optical axis direction. Or, the smaller angle of the angles formed by the urging direction of the urging member 310 and the third surface 213 is different from the smaller angle of the angles formed by the urging direction of the urging member 310 and the sixth surface 216. In an example, the third surface 213 has a higher gradient than the gradient of the sixth surface 216. In other words, the smaller angle of the angles formed by the optical axis direction and the third surface 213 is smaller than the smaller angle of the angles formed by the optical axis direction and the sixth surface 216. In this case, the first switching torque is set to be greater than the second switching torque. As a result, the non-photographing state (the retracted state, and the standby state) is maintained more strongly. A reliable lock can be performed against various movements of the camera in the non-photographing state. For example, it is possible to prevent the lens barrel from unintentionally extending and switching to the normal photographing state when the user hangs the camera from the neck and carries it in the non-photographing state (the retracted state, or the standby state). In another example, the sixth surface 216 can have a higher gradient than the gradient of the third surface 213. In other words, the smaller angle of the angles formed by the optical axis direction and the sixth surface 216 is smaller than the smaller angle of the angles formed by the optical axis direction and the third surface 213. As a result, it is possible to prevent the user from unintentionally switching to the non-photographing state, while photographing at a focal length near the wide end. The gradient of the sixth surface 216 and the gradient of the third surface 213 may be set in substantially the same manner.

In another example, the fifth surface 215 of the zoom ring 80 can be parallel to the D1 direction (the surface perpendicular to the optical axis direction). In this case, the distance between the second surface 212 and the fifth surface 215 (a depth of the recess 395) DP2 (not shown) can have a value different from the distance between the second surface 212 and the first surface 211 (a depth of the recess 390) DP1 (not shown). In an example, DP1 is larger than DP2. As a result, the non-photographing state (the retracted state, or the standby state) is maintained more strongly. A secure lock can be performed against various camera movements in non-photographing state. Further, since DP2 is smaller than DP1, the urging force in the D2 direction can be transferred to the zoom ring 80 in the normal photographing state. As a result, it is possible to generate the torque force required for the zoom operation from the wide end to the telephoto end. Further, as described above, it can also function as a rattling removal in the D2 direction. In another example, DP1 can be the same as or smaller than DP2.

Figure 7:
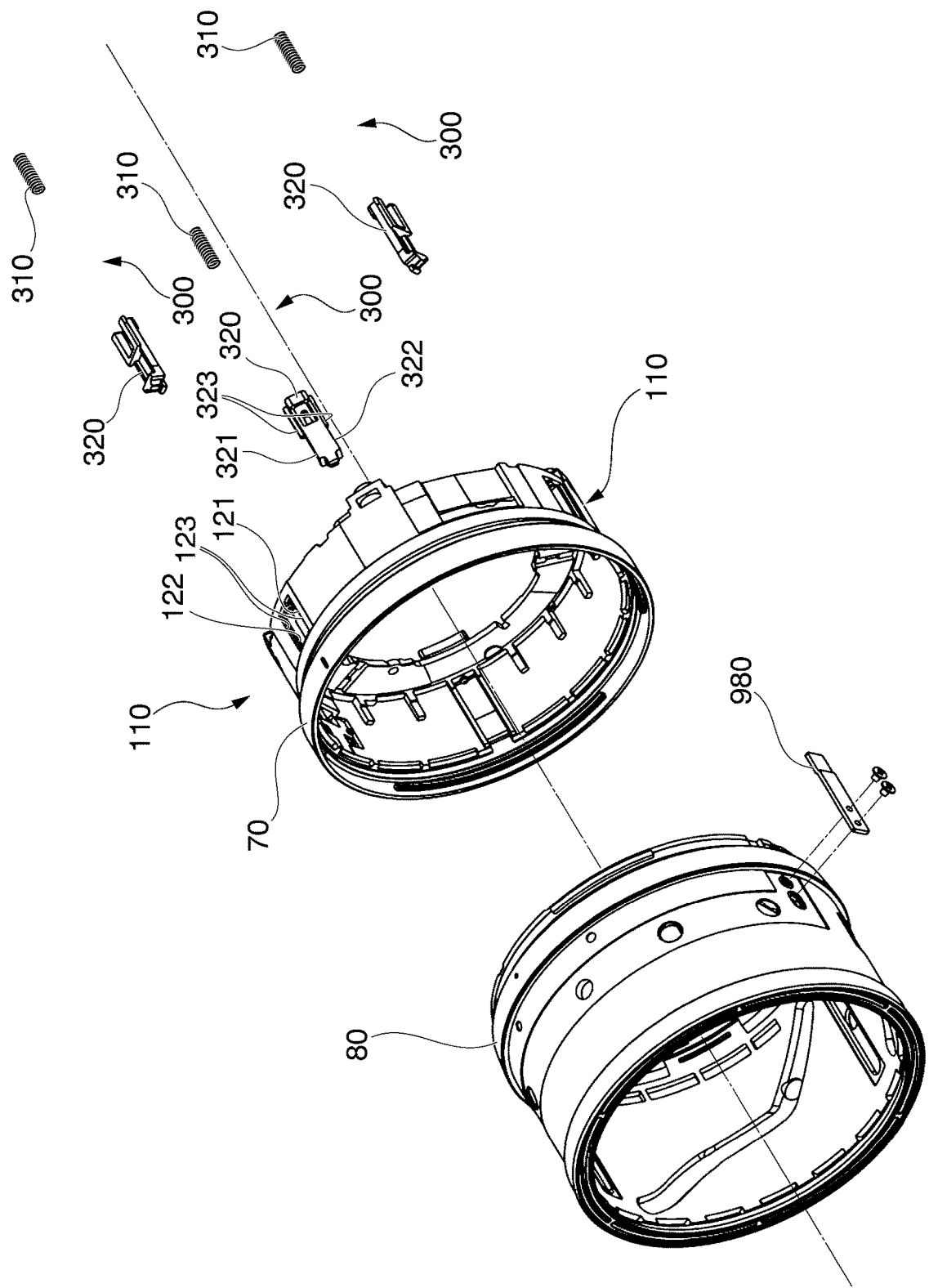
FIG. 7 is a perspective view of a fixed frame and a zoom ring.

In the lens barrel 1, in the telephoto end state, the further feeding operation is mechanically restricted by a restricting plate 980 shown in FIG. 7.

Figure 8:
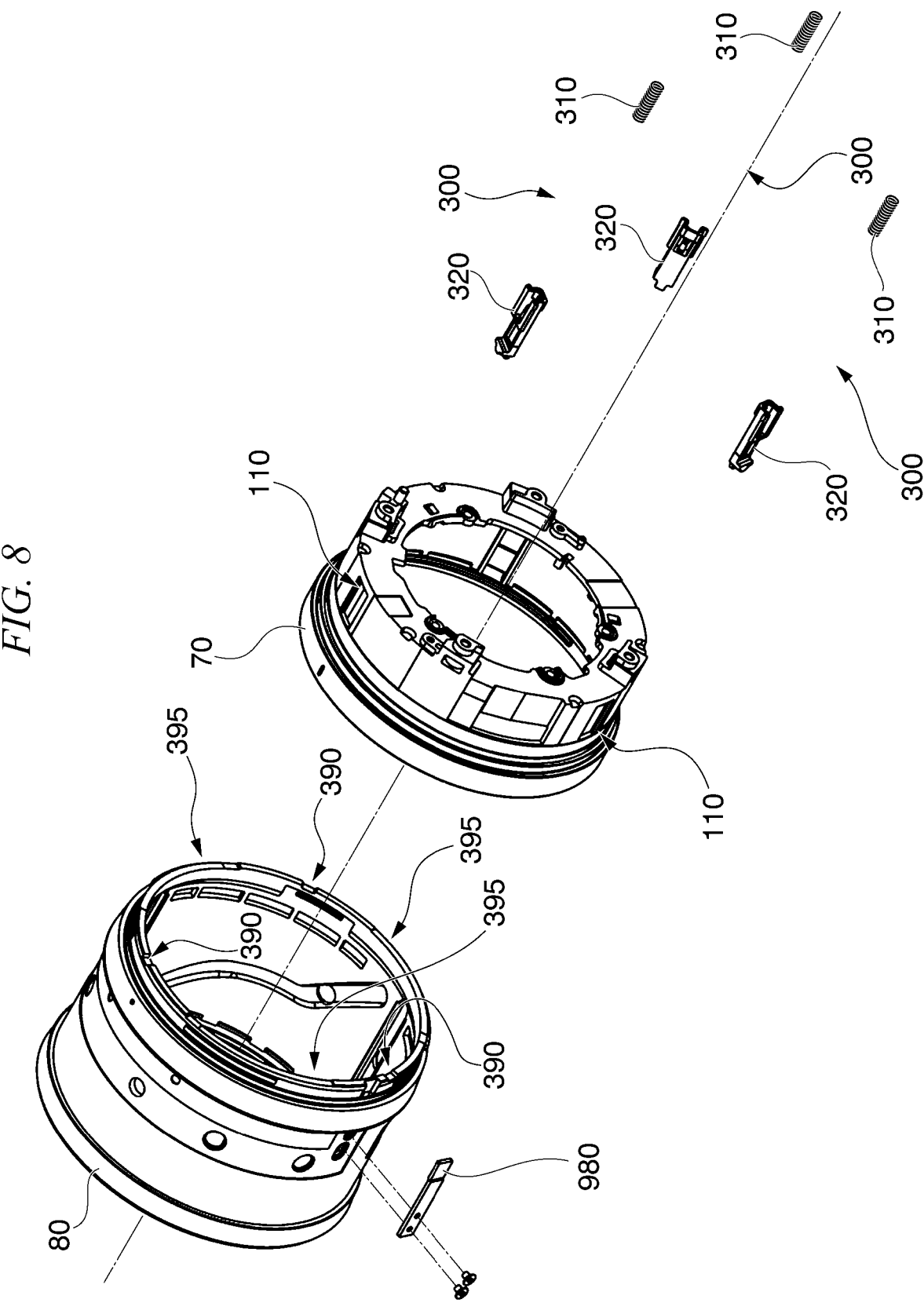
FIG. 8 is another perspective view of the fixed frame and the zoom ring.

As shown in FIGS. 7 and 8, three urging mechanisms 300 are disposed in the lens barrel 1. The three urging mechanisms 300 can be spaced apart from each other in the circumferential direction at equal intervals or non-equal interval. The urging member 310 of slim size is advantageous for disposing a plurality of urging mechanisms 300. One, two, three, four, five, six, seven, eight, nine, ten or more urging mechanisms 300 can be disposed with respect to one lens barrel 1.

A high load acts on the zoom ring 80 in the optical axis direction at a plurality of positions in the circumferential direction by the plurality of urging members 310. As a result, it is possible to set a higher load condition on the entire lens barrel 1. Or, the load is distributed to a plurality of locations in the circumferential direction, which contributes to the improvement of durability. Further, the deviation of the load in the circumferential direction is avoided, and the misalignment (occurrence of rattling) of the members in the optical axis direction due to the gap between the members is more reliably prevented. This is advantageous for improving the optical performance of the lens barrel 1.

As shown in FIGS. 7 and 8, holes (slots, or grooves) 110 for the urging member 310 and the moving piece 320 are provided on the peripheral wall of the fixed frame 70. The holes 110 have slide walls 121 and 122 along the optical axis direction. Further, at least a part of the bottom of the hole 110 functions as a slide wall 123. The moving piece 320 is restricted from moving in a direction intersecting the moving direction by the restricting portions provided on the slide walls 121, 122, and 123. For example, the slide walls 121, 122, and 123 have a wall surface provided parallel to the movement axis of the moving piece 320 as the restricting portion. The moving piece 320 moves along the wall surfaces of the slide walls 121 and 122, 123. Smooth movement of the moving piece 320 is provided by the slide walls 121, 122, 123.

The moving piece 320 has slide surfaces 321, 322, and 323 disposed to face each of the wall surfaces of the slide walls 121, 122, and 123. The slide surfaces 321, 322, and 323 are provided parallel to the movement axis of the moving piece 320. The movement of the moving piece 320 in the direction intersecting the moving direction is reliably restricted over the entire range of movement by the slide surfaces 321, 322, and 323. In the urging mechanism 300, although the structure is simple, the occurrence of twisting when the moving piece 320 moves is avoided, and a smoother movement of the moving piece 320 is achieved.

The posture of the moving piece 320 can be restricted and/or controlled substantially independently of the urging member 310. That is, the posture of the moving piece 320 can be restricted and/or controlled with high accuracy. As a result, surface-contact between the fixed frame 70 and the zoom ring 80 is reliably achieved. Or, a highly accurate torque control in zoom operation is reliably achieved.

As shown in FIG. 8, a profile having two recesses 390 and 395 is set in each of the three regions corresponding to the three urging mechanisms 300 on the axial end surface of the zoom ring 80. The provision of such a profile on the axial end surface contributes to the improvement of design flexibility, workability, and/or processing accuracy.

Figure 9:
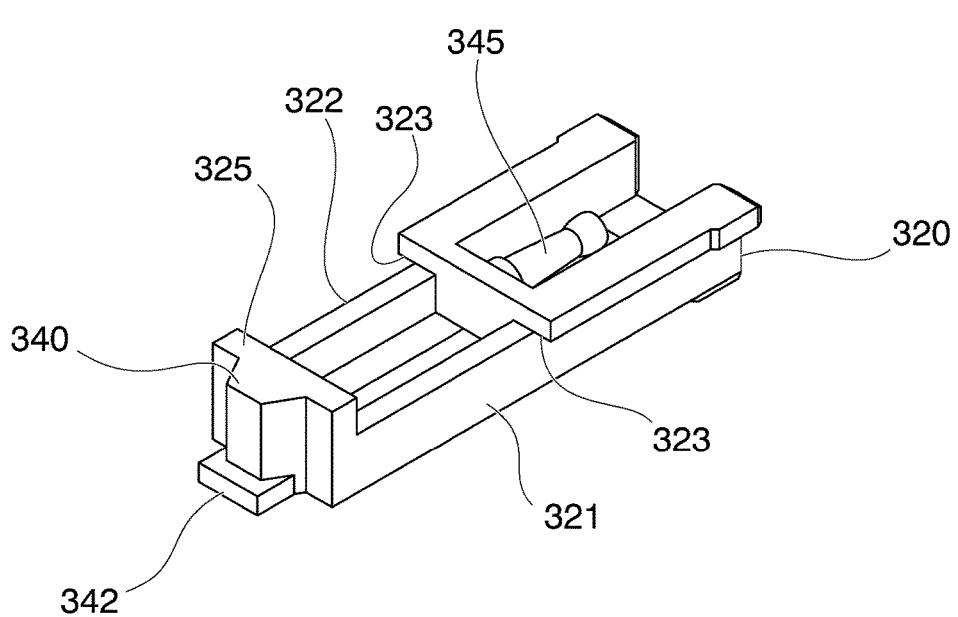
FIG. 9 is a diagram showing the moving piece.
Figure 9:
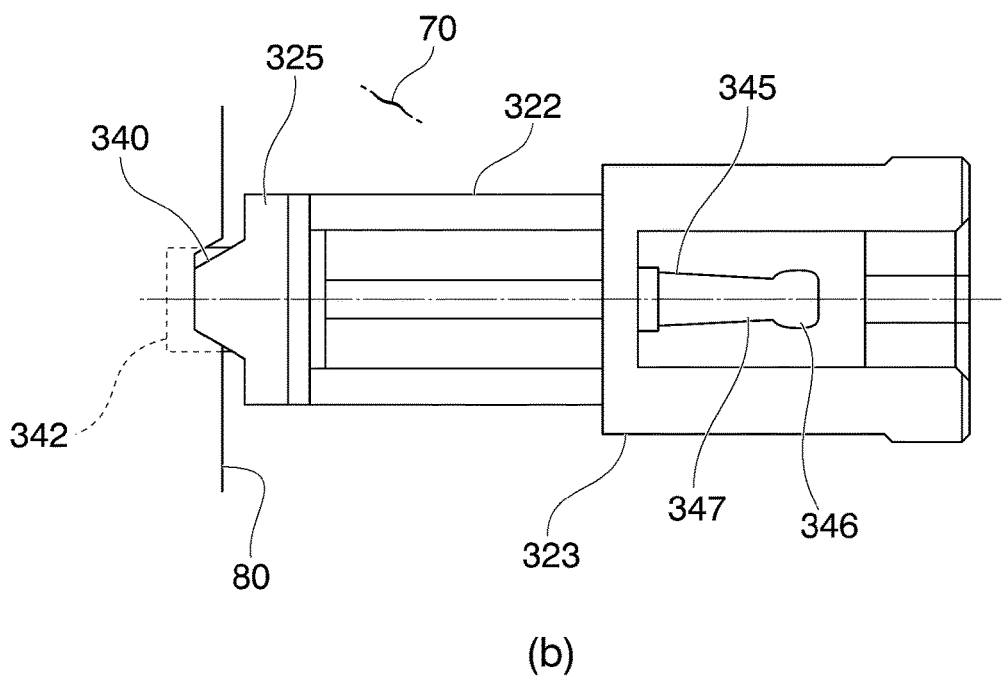

As shown in FIG. 9, the moving piece 320 has a slide surface 321 having a smooth outer surface, a slide surface 322 having a smooth outer surface, and a slide surface 323 having a smooth outer surface. The slide surface 321 and the slide surface 322 extend in the direction of the movement axis and are parallel to each other. The slide surface 323 extends in the direction of the movement axis and is perpendicular to the slide surface 321 and the slide surface 322. The posture of the moving piece 320 having such a configuration can be restricted and/or controlled with high accuracy via the slide surfaces 321, 322, and 323.

In an example, the slide surface 323 has a plurality of slide surfaces (323) separated from each other in a direction intersecting the movement axis. This is advantageous for a posture control of the moving piece 320 with high accuracy. A protruding portion (a contact portion) 340 may be disposed between the plurality of slide surfaces (323) in a direction intersecting the movement axis. This is also advantageous for a posture control of the moving piece 320 with high accuracy.

Figure 10:
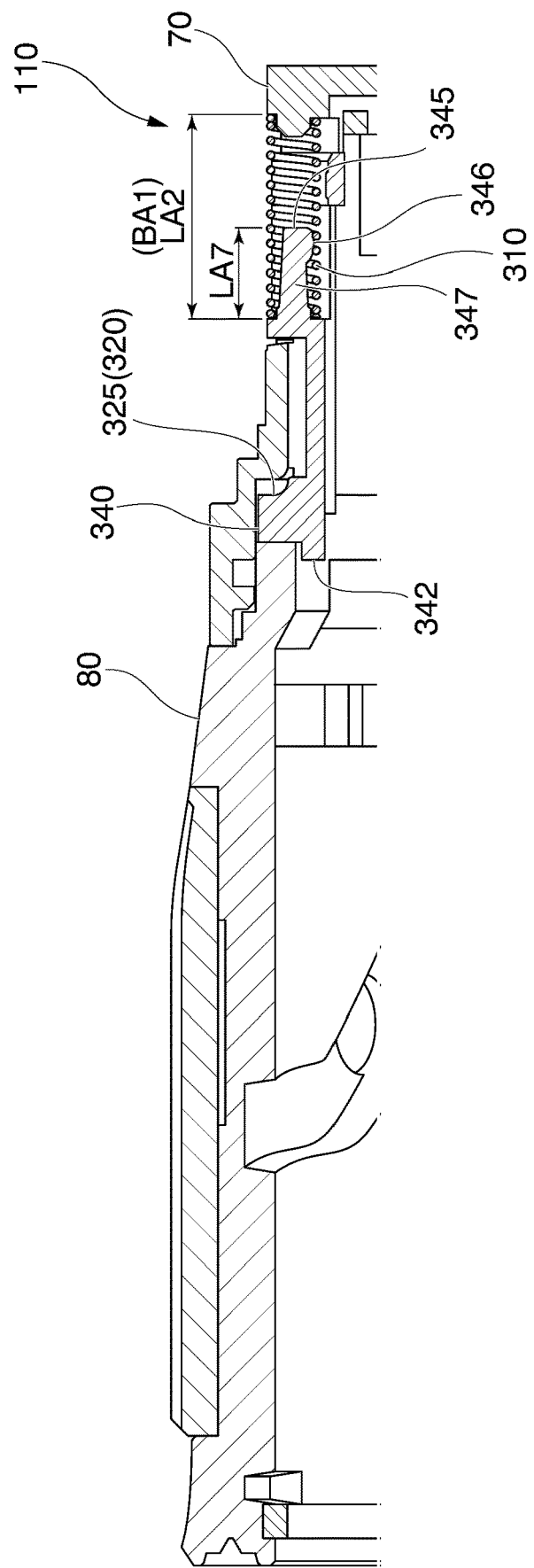
FIG. 10 is a partial cross-sectional view of the lens barrel.

As shown in FIG. 10, the moving piece 320 has a main body 325, a first protruding portion (a contact portion) 340 provided to protrude forward from the main body 325 along the movement axis, a second protruding portion (a support portion) 342 provided to protrude further forward from the first protruding portion 340. The second protruding portion 342 is provided on the bottom of the main body 325 and has, for example, a plate shape. At least a part of the second protruding portion 342 faces a part of the inner peripheral surface of the zoom ring 80. As a result, the second protruding portion 342 can support the zoom ring 80 in the radial direction. This contributes to the improvement of the holding strength of the zoom ring 80 with respect to the fixed frame 70.

As shown in FIG. 10, the moving piece 320 has a post 345 to which the urging member 310 is attached. The urging member 310 is a compression coil spring. A post 345 is inserted to the coil center of the urging member 310 from the coil end along the axial direction. When a distance (a maximum distance) from one end to the other end of the urging member 310 disposed in a region BA1 along the axial direction is set to LA2, and an axial length of the post 345 is set to LA7, the LA7 can be about 10, 20, 30, 40, 50, 60 or 70% of LA2. The aforementioned numerical values are typical examples, and different numerical values can be applied in other examples. By appropriately setting the length of the post 345, the posture of the urging member 310 is prevented from collapsing.

The post 345 has at least a thick portion 346 provided at the tip, and a thin portion 347 provided between a base end portion and the tip. An outer diameter of the thick portion 346 is set to a value greater than an outer diameter of the thin portion 347. Further, the outer diameter of the thick portion 346 is set to a value smaller than an inner diameter of the urging member 310. The thick portion 346 has a thick shape only in a part in the circumferential direction. That is, the thick portion 346 has a non-circular cross-sectional shape. In the thick portion 346 of the post 345, the center of gravity of the cross-sectional area is disposed to be displaced in the radial direction with respect to the central axis of the urging member 310. By setting the thick portion 346, the posture of the urging member 310 is prevented from collapsing.

Figure 11:
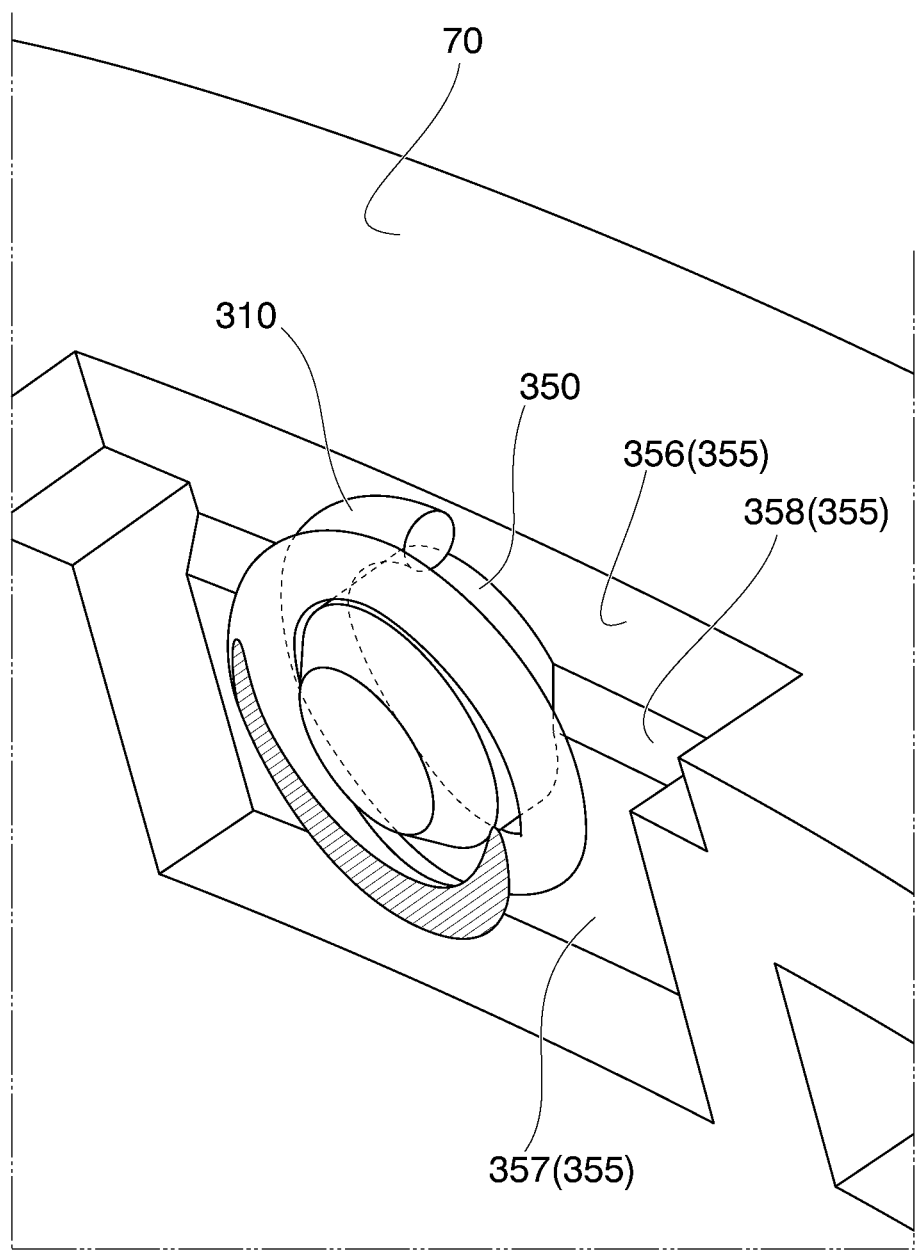
FIG. 11 is a diagram showing an installation structure of the urging member.
Figure 12:
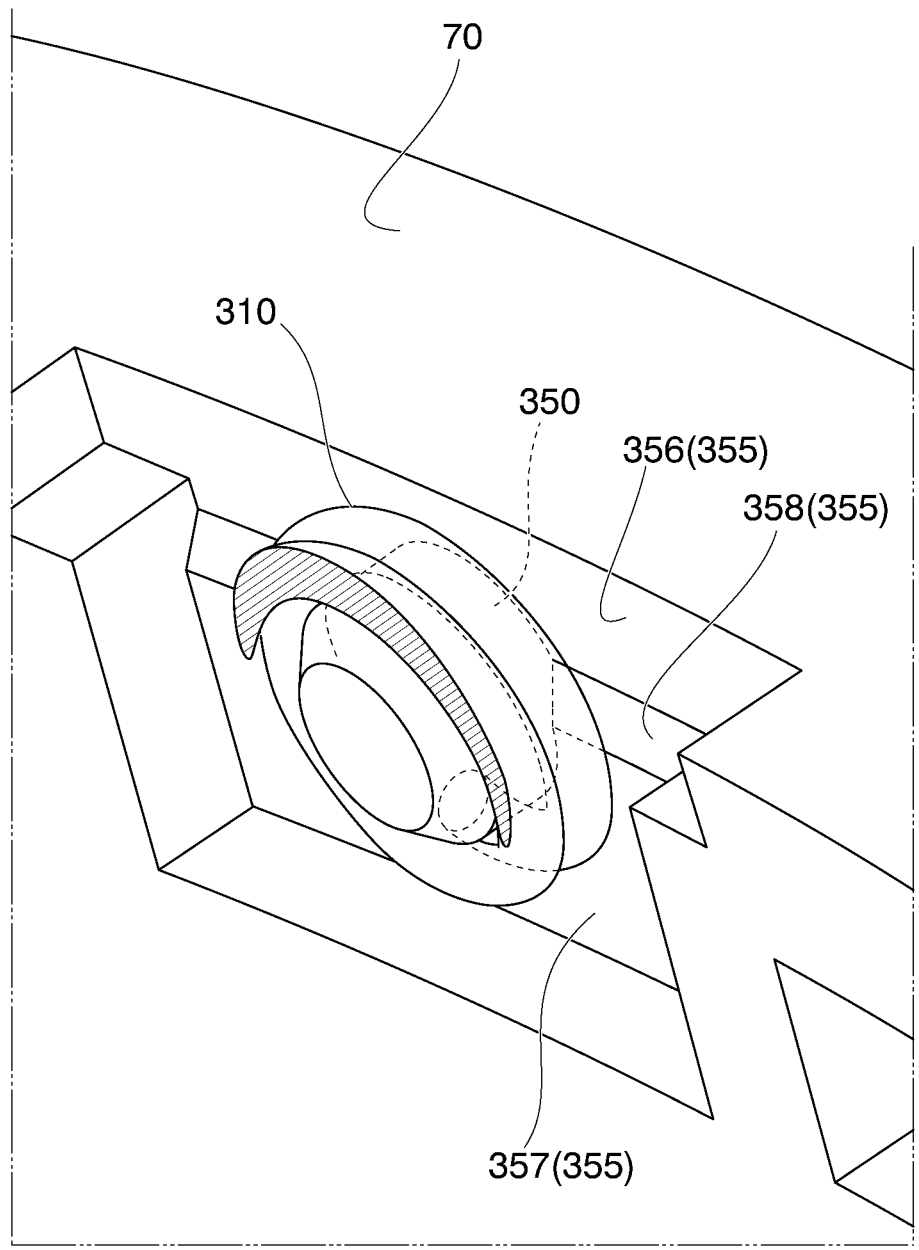
FIG. 12 is a diagram showing another installation structure of the urging member.

As shown in FIG. 11, the fixed frame 70 has a post 350 to which the urging member 310 is attached, and a wall 355 to which the post 350 is attached. The post 350 is inserted at one end of the urging member 310. The wall 355 has a first surface 356, a second surface 357, and a third surface 358. In the axial direction of the post 350, the first surface 356 and the second surface 357 have different height levels from each other. The third surface 358 is disposed between the first surface 356 and the second surface 357, and connects the first surface 356 and the second surface 357. The post 350 is disposed to cover a part of the first surface 356, a part of the second surface 357, and a part of the third surface 358. A step shape is set on the wall 355 at the base end portion of the post 350. The tip of the wire rod of the urging member (the coil spring) 310 is disposed on any of the first surface 356, the second surface 357, and the third surface 358. In an example, the tip of the wire rod of the urging member 310 is disposed on the first surface 356, which has the lowest height level. In this way, by providing a height difference on the wall with which the end portion of the urging member 310 is in contact, the collapse of posture due to the winding shape of the urging member 310 is avoided. When the tip of the wire rod of the urging member 310 is disposed on the second surface 357 having the highest height level, it is possible to prevent the urging member 310 from bending inward and being incorporated. That is, the posture can be controlled. In another example, as shown in FIG. 12, the tip of the wire rod of the urging member 310 is disposed on the second surface 357, which has the highest height level. Or, the urging member 310 is disposed so that the tip end portion of the wire rod of the urging member 310 intersects the third surface 358 (or engages with the step of the wall 355). If it is possible to add a process for flattening the spring end surface, there is no need to provide the step shape.

Although the example in which the urging member 310 is provided on the fixed frame 70 and the moving piece 320 is urged against the zoom ring 80 has been described, the present invention is not limited thereto. For example, the urging member 310 may be provided on the zoom ring 80, and the moving piece 320 may be urged against the fixed frame 70. In this case, the first surface 211 to the seventh surface 217 are provided in the fixed frame 70.

Although an example in which the urging member 310 is urged in the optical axis direction has been described, the present invention is not limited thereto. For example, a configuration in which the urging member 310 is urged in the radial direction of a circle centered on the optical axis may be adopted.

The urging mechanism 300 is not limited to the control between the fixed frame 70 and the zoom ring 80. The urging mechanism 300 is also applicable to control between various two members in the lens barrel 1.

In an embodiment, the lens barrel (1) is equipped with the first frame (70), the second frame (80) rotatable with respect to the first frame, an urging member (310) held by one of the first frame and the second frame, and a moving member (320) which is disposed to be movable in the optical axis direction and transfers the urging force of the urging member to another one of the first frame and the second frame.

For example, in the aforementioned embodiment, the another one has a first surface (215, 211) and a second surface (212), and the urging force in a state in which the moving member (320) comes into contact with the first surface (215, 211) is smaller than the urging force in a state in which the moving member (320) comes into contact with the second surface (212).

For example, in the aforementioned embodiment, the another one has a third surface (216, 213) which connects the first surface (215, 211) and the second surface (212) and is inclined with respect to the optical axis direction.

For example, in the aforementioned embodiment, the another one has a fourth surface (213, 216) which is connected to the second surface (212) at a side opposite to the third surface (216, 213) and is inclined with respect to the optical axis direction.

For example, in the aforementioned embodiment, an inclination of the fourth surface (213, 216) with respect to the optical axis direction is different from an inclination of the third surface (216, 213) with respect to the optical axis direction.

For example, in the aforementioned embodiment, a smaller angle of angles formed by the optical axis direction and the fourth surface (213, 216) is smaller than a smaller angle of angles formed by the optical axis direction and the third surface (216, 213).

For example, in the aforementioned embodiment, the moving member (320) has a fifth surface (312, 313) which is able to come into surface-contact with the fourth surface (213, 216).

For example, in the aforementioned embodiment, the fourth surface (213, 216) and the fifth surface (312, 313) are substantially parallel to each other.

For example, in the aforementioned embodiment, the moving member (320) has a sixth surface (313, 312) which is able to come into surface-contact with the third surface (216, 213), and the third surface (216, 213) and the sixth surface (313, 312) are substantially parallel to each other.

For example, in the aforementioned embodiment, the lens barrel (1) further includes a third frame (50) disposed at an inner peripheral side of the first frame (70) and the second frame (80), the urging member (310) urges the third frame (50) in the optical axis direction via the moving member (320) and the another one, and a plurality of urging members (310) and moving members (320) are disposed.

In another embodiment, a lens barrel (1) switchable between a photographing state and a contracted state is equipped with a first frame (70), a second frame (80) which is rotatable relative to the first frame, an urging portion (310) held by one of the first frame and the second frame and having an urging force in a contracting direction, and a contact portion (320, 340) which is urged by the urging portion and is able to come into contact with another one of the first frame and the second frame.

For example, in the aforementioned embodiment, the contact portion (320, 340) is urged by the urging portion (310) to be movable in a contracting direction.

For example, in the aforementioned embodiment, the lens barrel (1) further includes a third frame (50) disposed at an inner peripheral side of the first frame (70) and the second frame (80), and the urging portion (310) is able to urge the third frame in the contracting direction at least via the contact portion (320, 340) and the another one.

In another embodiment, a lens barrel (1) is equipped with a fixed frame (70), a rotation frame (80) disposed to be rotatable around the optical axis, an urging member (310) held by one of the fixed frame and the rotation frame, and a moving member (320) urged by the urging portion and disposed to be movable in an optical axis direction, and another one of the fixed frame and the rotation frame has a first surface (215, 211) and a second surface (212), and the urging member changes in an amount of deflection or a total length between a state in which the moving member is in contact with the first surface and a state in which the moving member is in contact with the second surface.

In another embodiment, a lens barrel (1) is equipped with a first member (70), a second member (80) having a relationship of relative movement between the first member and the second member at least in a first direction, an urging member (310) held by one of the first member and the second member, and a moving member (320) which is disposed to be movable at least along another one of the first member and the second member, and transfers an urging force of the urging member to the another one.

In another embodiment, a lens barrel (1) includes a first frame (70), a second frame (80) which is rotatable relative to the first frame, an urging portion (310) held by one of the first frame and the second frame, and a contact portion (320, 340) which is able to come into surface-contact with another one of the first frame and the second frame by the urging portion.

In another embodiment, an imaging apparatus (500) is equipped with any of the lens barrels (1), and a main body (510) including an image pickup element (520).

Although the present invention has been described above using the embodiments, the technical scope of the present invention is not limited to the scope described in the aforementioned embodiments. It will be apparent to those skilled in the art that various changes or improvements can be made to the aforementioned embodiments. It is obvious from the description of the claims that such modified or improved forms may also be included in the technical scope of the present invention. Moreover, the present invention is not limited to the above-described embodiment, and arbitrary combination of the configurations may be used.

REFERENCE SIGNS LIST

1 Lens barrel
L1 First group lens
L2 Second group lens
L3 Third group lens
L4 Fourth group lens
L5 Fifth group lens
10 First moving barrel
11 First lens frame
20 Second moving barrel
21 Second lens frame
22 Cam follower
30 Rectilinear-moving barrel
31 Third lens frame
32 Circumferential groove
33 Key
35 Third moving barrel
45 Actuator (focus motor)
40 Fourth moving barrel
41 Fourth lens frame
50 Cam barrel (third frame)
52 Cam groove
53 Connecting pin
54 Cam groove
60 Fixed barrel
62 Cam follower
63 Linear groove
70 Fixed frame (first member, first frame)
80 Zoom ring (second member, rotation frame, second frame)
90 Mount
300 Urging mechanism

The invention claimed is:

1. A lens barrel switchable between a first mode in which a total length of the lens barrel is fixed and a second mode in which the total length of the lens barrel is changeable, the lens barrel comprising:
   a first frame;
   a second frame that is rotatable with respect to the first frame, the second frame having a first surface, a second surface and a third surface, the first surface and the second surface having respective inclinations with respect to an optical axis direction, and the third surface being disposed between the first surface and the second surface and being perpendicular to an optical axis;
   an urging member that is held in the first frame; and
   a moving member that is movable in the optical axis direction and is arranged to be in contact with the second frame by an urging force of the urging member, wherein:
   in the first mode, the moving member is in contact with the first surface;
   in the second mode, the moving member is in contact with the second surface; and
   in a third mode in which the first mode is transited to the second mode, the moving member slides in contact with the third surface.

2. The lens barrel according to claim 1, wherein the third surface has a length in a circumferential direction about the optical axis.

3. The lens barrel according to claim 1, wherein the moving member has a slide surface that slides in contact with the third surface, and the third surface is longer than the slide surface.

4. The lens barrel according to claim 3, wherein the third surface is arranged to be in contact with the slide surface in surface contact.

5. The lens barrel according to claim 3, wherein, while the slide surface slides from one end of the third surface to the other end, a torque is generated with respect to relative rotation between the first frame and the second frame.

6. The lens barrel according to claim 1, wherein the moving member has a contact surface that is generally parallel to the first surface.

7. The lens barrel according to claim 1,
wherein the inclination of the first surface with respect to the optical axis direction is different from the inclination of the second surface with respect to the optical axis direction.

8. The lens barrel according to claim 7,
wherein a smaller angle of angles formed by the first surface and the optical axis direction is smaller than a smaller angle of angles formed by the second surface and the optical axis direction.

9. The lens barrel according to claim 1, further comprising:
a third frame that is disposed at an inner peripheral side of the first frame and the second frame,
wherein the urging member urges the third frame in the optical axis direction via the moving member or the first frame or the second frame.

10. The lens barrel according to claim 1, comprising a plurality of the urging members and the moving members.

11. An imaging apparatus comprising:
the lens barrel of claim 1; and
a main body including an image pickup element.

12. A lens barrel switchable between a non-contracted, photographing state and a contracted state, the lens barrel comprising:
a first frame;
a second frame that is rotatable with respect to the first frame;
an urging member that is held by one of the first frame and the second frame and has an urging force in an optical axis direction; and
a moving member that is disposed to be movable in the optical axis direction and transfers an urging force of the urging member to another one of the first frame and the second frame,
wherein the other one has first and second surfaces with which, in the photographing state, the moving member slides in contact.

13. The lens barrel according to claim 12,
wherein the urging force in a state in which the moving member slides in contact with the first surface is smaller than the urging force in a state in which the moving member slides in contact with the second surface.

14. The lens barrel according to claim 12, wherein the other one has a third surface, which connects the first surface and the second surface and is inclined with respect to the optical axis direction, and a fourth surface, which connects to the second surface at a side opposite to the third surface and is inclined with respect to the optical axis direction.

15. The lens barrel according to claim 14, wherein a smaller angle of angles formed by the optical axis direction and the fourth surface is smaller than a smaller angle of angles formed by the optical axis direction and the third surface.

16. The lens barrel according to claim 12, comprising a plurality of the urging members and the moving members.

17. An imaging apparatus comprising:
the lens barrel of claim 12; and
a main body including an image pickup element.

18. A lens barrel switchable between a non-contracted, photographing state and a contracted state, the lens barrel comprising:
a first frame;
a second frame that is rotatable with respect to the first frame, the second frame having a first surface, a second surface and a third surface, the first surface and the second surface having respective inclinations with respect to an optical axis direction, and the third surface being disposed between the first surface and the second surface and being perpendicular to an optical axis;
an urging member that is held in the first frame; and
a moving member that is movable in the optical axis direction and is arranged to be in contact with the second frame by an urging force of the urging member, wherein:
in the photographing state, the moving member is in contact with the first surface;
in the contracted state, the moving member is in contact with the second surface; and
when the photographing state is transited to the contracted state, the moving member slides in contact with the third surface.

19. The lens barrel according to claim 18,
wherein the third surface has a length in a circumferential direction about the optical axis.

20. The lens barrel according to claim 18,
wherein the moving member has a slide surface that slides in contact with the third surface, and the third surface is longer than the slide surface.

21. The lens barrel according to claim 20,
wherein the third surface is arranged to be in contact with the slide surface in surface contact.

22. The lens barrel according to claim 20,
wherein, while the slide surface slides from one end of the third surface to the other end, a torque is generated with respect to relative rotation between the first frame and the second frame.

23. The lens barrel according to claim 18,
wherein the moving member has a contact surface that is generally parallel to the first surface.

24. The lens barrel according to claim 18,
wherein the inclination of the first surface with respect to the optical axis direction is different from the inclination of the second surface with respect to the optical axis direction.

25. The lens barrel according to claim 24,
wherein a smaller angle of angles formed by the first surface and the optical axis direction is smaller than a smaller angle of angles formed by the second surface and the optical axis direction.

26. The lens barrel according to claim 18, further comprising:
a third frame that is disposed at an inner peripheral side of the first frame and the second frame,
wherein the urging member urges the third frame in the optical axis direction via the moving member or the first frame or the second frame.

27. The lens barrel according to claim 18, comprising a plurality of the urging members and the moving members.

28. An imaging apparatus comprising:
the lens barrel of claim 18; and
a main body including an image pickup element.

* * * * *